US012771635B2

(12) United States Patent
Kim

(10) Patent No.: US 12,771,635 B2
(45) Date of Patent: *Oct. 20, 2026

(54) SYSTEM FOR CONTROLLING DATA FLOW BASED ON LOGICAL CONNECTION IDENTIFICATION AND METHOD THEREOF

(71) Applicant: PRIBIT AI Inc., Seoul (KR)

(72) Inventor: Young Rang Kim, Seoul (KR)

(73) Assignee: PRIBIT AI Inc., Seoul (KR)

( * ) Notice: Subject to any disclaimer, the term of this patent is extended or adjusted under 35 U.S.C. 154(b) by 34 days.

This patent is subject to a terminal disclaimer.

(21) Appl. No.: 18/630,509

(22) Filed: Apr. 9, 2024

(65) Prior Publication Data

US 2024/0348540 A1 Oct. 17, 2024

(30) Foreign Application Priority Data

Apr. 11, 2023 (KR) ........................ 10-2023-0047824

(51) Int. Cl.
*H04L 45/00* (2022.01)
*H04L 9/40* (2022.01)
(Continued)

(52) U.S. Cl.
CPC ............ *H04L 45/38* (2013.01); *H04L 43/026* (2013.01); *H04L 47/2483* (2013.01);
(Continued)

(58) Field of Classification Search
CPC .... H04L 43/026; H04L 69/22; H04L 63/0236
See application file for complete search history.

(56) References Cited

U.S. PATENT DOCUMENTS 8,958,293 B1 * 2/2015 Anderson ........... H04L 67/1001 370/230
2005/0216954 A1 * 9/2005 Ramaiah ............. H04L 63/1458 726/22

(Continued)

FOREIGN PATENT DOCUMENTS

KR 10-2223827 B1 3/2021
KR 10-2309116 B1 10/2021

(Continued)

*Primary Examiner* — Hieu T Hoang
(74) *Attorney, Agent, or Firm* — Seed Intellectual Property Law Group LLP

(57) ABSTRACT

Disclosed is a gateway which includes a communication circuit, a memory, and a processor operatively connected with the communication circuit and the memory. The processor receives a data packet of a node through a network processing layer, identifies whether there is data flow corresponding to the data packet of the node and authorized from an external server, inspects authentication information of the data packet, when there is a need to inspect the authentication information of the data packet based on authentication information included in the data flow, generates data flow identification information capable of being identified by an application processing layer based on the data packet and forward the data packet to the application processing layer, and processes the forwarded data packet based on the data flow identification information by means of the application processing layer.

20 Claims, 21 Drawing Sheets

(51) Int. Cl.
*H04L 43/026* (2022.01)
*H04L 47/2483* (2022.01)
*H04L 69/22* (2022.01)

(52) U.S. Cl.
CPC .......... *H04L 63/0227* (2013.01); *H04L 63/08* (2013.01); *H04L 69/22* (2013.01)

(56) References Cited

U.S. PATENT DOCUMENTS

| | | | | |
|---|---|---|---|---|
| 2006/0020684 | A1* | 1/2006 | Mukherjee | H04L 67/561 709/219 |
| 2014/0237539 | A1* | 8/2014 | Wing | H04L 63/08 726/1 |
| 2021/0091976 | A1* | 3/2021 | Kim | H04L 12/4633 |
| 2021/0092094 | A1* | 3/2021 | Kim | H04L 63/08 |
| 2021/0092095 | A1 | 3/2021 | Kim et al. | |
| 2021/0328830 | A1 | 10/2021 | Kim et al. | |
| 2022/0247718 | A1 | 8/2022 | Kim et al. | |
| 2022/0247719 | A1 | 8/2022 | Kim et al. | |
| 2022/0247720 | A1 | 8/2022 | Kim | |
| 2022/0247721 | A1 | 8/2022 | Kim | |
| 2022/0247748 | A1 | 8/2022 | Kim | |
| 2022/0255906 | A1 | 8/2022 | Kim et al. | |
| 2022/0337604 | A1 | 10/2022 | Kim et al. | |
| 2023/0028529 | A1* | 1/2023 | Puvvada | H04L 12/4633 |
| 2023/0171194 | A1* | 6/2023 | Talur | H04L 45/7453 370/392 |
| 2024/0080299 | A1 | 3/2024 | Kim | |

FOREIGN PATENT DOCUMENTS

| | | | | |
|---|---|---|---|---|
| KR | 10-2333555 | B1 | 12/2021 | |
| KR | 102364445 | B1 * | 2/2022 | H04L 43/20 |
| KR | 10-2460694 | B1 | 10/2022 | |

* cited by examiner

SYSTEM FOR CONTROLLING DATA FLOW BASED ON LOGICAL CONNECTION IDENTIFICATION AND METHOD THEREOF

CROSS-REFERENCE TO RELATED APPLICATION

This application claims the benefit of priority to Korean Patent Application No. 10-2023-0047824, filed in the Korean Intellectual Property Office on Apr. 11, 2023, the entire contents of which are incorporated herein by reference.

BACKGROUND

Technical Field

The present disclosure relates to a system for controlling data flow based on logical connection identification and a method thereof.

Description of the Related Art

A plurality of devices may communicate data over a network. For example, a terminal may transmit or receive data with a server over the Internet. The network may include a private network such as an intranet as well as a public network such as the Internet.

There is a technology for interpreting information transmitted using a well-known standard protocol (or specification), such as the hyper text transfer protocol (HTTP), by means of a proxy which is present in layer 7 (an application layer) among OSI 7 layers and combining various pieces of information (a domain, a URL, contents, and a file) with an authenticated and authorized communication target (a node, a user, or an application) to control optimized access and privilege.

The above-mentioned technology controls network access using a security session and channel information generated based on a tunneling-based source IP, a source IP on a controllable network or a network in which IP uniqueness is ensured, a previously authorized certificate, or identified certificate information to identify the authenticated or authorized communication target.

BRIEF SUMMARY

The present disclosure has been made to solve the above-mentioned problems occurring in the prior art while advantages achieved by the prior art are maintained intact.

Because a process such as tunneling generation should be added to process only data flow of an authenticated and authorized communication target in the process of performing IP communication in a network access control scheme using a security session and channel information, there is a limitation in accurately controlling network access without an additional procedure in a universal IP communication environment.

Because communication is able to be performed without the necessity of implementing each IP specification by means of an IP driver included in an operating system in a communication process between an application (e.g., a web browser) of a source node and an application (e.g., a web server) of a destination node, the above problem may occur because the application which is a substantial communication entity is unable to control layer 3 (a network layer) which is a layer for performing substantial IP communication in an OSI 7-layer model.

Thus, the application of each node which is a mutual communication entity has no choice but to receive data in the state in which it implicitly trusts a data packet delivered by an operating system. Because identification information of a communication target is limited to an IP address, which is a limit of IP communication, an additional procedure such as tunneling generation is inevitably required.

An aspect of the present disclosure provides a system for addressing the above-mentioned problem in a network environment and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a gateway may include a communication circuit, a memory, and a processor operatively connected with the communication circuit and the memory. The processor may be configured to receive a data packet of a node through a network processing layer, identify whether there is data flow corresponding to the data packet of the node and authorized from an external server, inspect authentication information of the data packet, when there is a need to inspect the authentication information of the data packet based on authentication information included in the data flow, generate data flow identification information capable of being identified by an application processing layer based on the data packet and forward the data packet to the application processing layer, and process the forwarded data packet based on the data flow identification information by means of the application processing layer.

According to another aspect of the present disclosure, a gateway may include a communication circuit, a memory, and a processor operatively connected with the communication circuit and the memory. The processor may be configured to receive a data packet of a node through a network processing layer, identify whether there is data flow corresponding to the data packet of the node and authorized from an external server, inspect authentication information of the data packet, when there is a need to inspect the authentication information of the data packet based on authentication information included in the data flow, and generate data flow identification information capable of being identified by an application processing layer based on the data packet, update authentication information of the data flow, and forward the data packet to the application processing layer, and process a service associated with the forwarded data packet based on authentication information of data flow corresponding to the generated data flow identification information, by means of the application processing layer.

According to another aspect of the present disclosure, a service server may include a communication circuit, a memory, and a processor operatively connected with the communication circuit and the memory. The processor may be configured to receive a data packet of a node through a network processing layer, identify whether there is data flow corresponding to the data packet of the node and authorized from an external server, inspect authentication information of the data packet, when there is a need to inspect the authentication information of the data packet based on authentication information included in the data flow, and generate data flow identification information capable of being identified by an application processing layer based on the data packet and forward the generated data flow identification information and the data packet to the application processing layer.

According to another aspect of the present disclosure, an operation method of a gateway may include receiving a data packet of a node through a network processing layer, identifying whether there is data flow corresponding to the data packet of the node and authorized from an external server, inspecting authentication information of the data packet, when there is a need to inspect the authentication information of the data packet based on authentication information included in the data flow, generating data flow identification information capable of being identified by an application processing layer based on the data packet and forwarding the data packet to the application processing layer, and processing the forwarded data packet based on the data flow identification information by means of the application processing layer.

BRIEF DESCRIPTION OF THE SEVERAL VIEWS OF THE DRAWINGS

The above and other objects, features and advantages of the present disclosure will be more apparent from the following detailed description taken in conjunction with the accompanying drawings.

DETAILED DESCRIPTION

Figure 1:
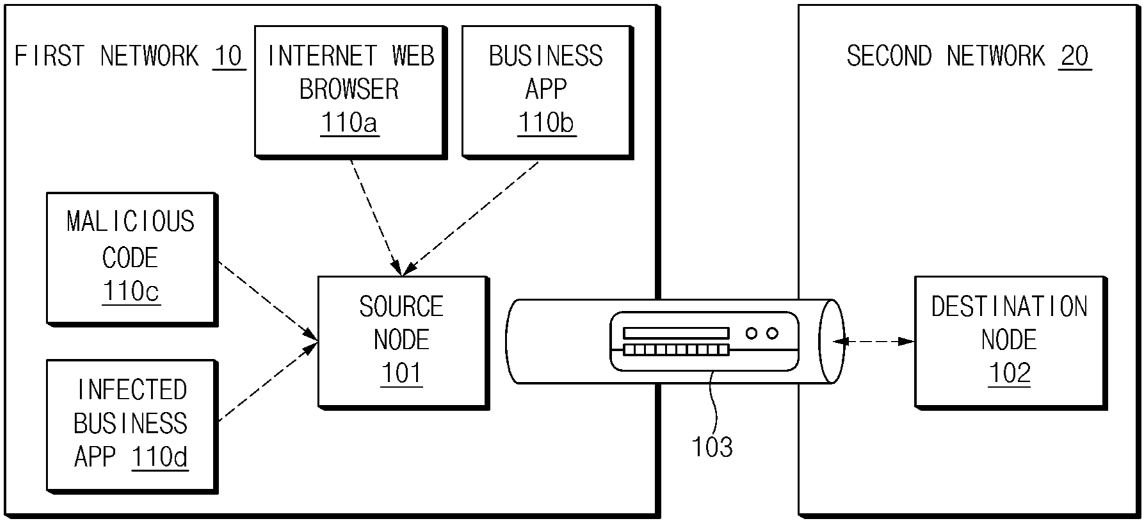
FIG. 1 illustrates an environment including a plurality of networks.

Hereinafter, various embodiments of the present disclosure will be described with reference to the accompanying drawings. However, it should be understood that this is not intended to limit the present disclosure to specific implementation forms and includes various modifications, equivalents, and/or alternatives of embodiments of the present disclosure.

A singular form of a noun corresponding to an item in the present disclosure may include one or plural of the items, unless the relevant context clearly indicates otherwise. In the present disclosure, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). It is to be understood that if any (e.g., a first) component is referred to, with or without the term "operatively" or "communicatively," as "coupled with," "coupled to," "connected with," or "connected to" another (e.g., a second) component, it means that the element may be coupled with the other element directly (e.g., wiredly), wirelessly, or via a third component.

Each (e.g., a module or a program) of components described in the present disclosure may include singular or plural entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the present disclosure, the term "module" may include a unit implemented in hardware, software, or firmware, and may interchangeably be used with other terms, for example, "logic," "logic block," "part," or "circuit." A module may be an integral part, or a minimum unit or portion thereof, adapted to perform one or more functions. For example, according to an embodiment, the module may be implemented in the form of an application-specific integrated circuit (ASIC).

Various embodiments of the present disclosure may be implemented as software (e.g., a program) including instructions that are stored in a machine-readable storage medium (e.g., an internal memory or an external memory). For example, a processor of the machine may invoke at least one of the stored one or more instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

A method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as a memory of the manufacturer's server, a server of the application store, or a relay server.

FIG. 1 illustrates an environment including a plurality of networks.

Referring to FIG. 1, a first network 10 and a second network 20 may be different networks. For example, the first network 10 may be a public network, such as the Internet, and the second network 20 may be a private network, such as an intranet or a virtual private network (VPN).

The first network 10 may include a source node 101. In FIG. 1 and embodiments described below, the "source node" may be various types of devices capable of performing data communication. For example, the source node 101 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. For example, the source node 101 may include a server or a gateway capable of transmitting a data packet through an application. The source node 101 may be referred to as an "electronic device" or a "terminal." Meanwhile, a destination node 102 may include a device which is the same as or similar to the above-mentioned source node 101. For another example, the destination node 102 may be substantially the same as a destination network.

The source node 101 may attempt to access the second network 20 and may transmit data to a destination node 102 included in the second network 20. The source node 101 may transmit data to the destination node 102 through a gateway 103.

When access of the source node 101 to the first network 10 is granted, because the source node 101 is able to communicate with all servers included in the first network 10, it may be exposed from an attack of a malicious program. For example, the source node 101 may receive a malicious code 110*c* or data of an untrusted or insecure application, such as an infected business application (app) 110*d*, as well as an Internet web browser 110*a* or a trusted and/or secure application, such as a business app 110*b*.

The source node 101 infected from the malicious program may attempt to access the second network 20 and/or transmit data to the second network 20. When the second network 20 is established based on an IP like a VPN, it may be difficult for the second network 20 to separately monitor a plurality of devices included in the second network 20 and the second network 20 may be vulnerable to security for an application layer or a transport layer in an OSI layer. Furthermore, when the source node 101 includes a malicious application after the channel is already generated, data of the malicious application may be delivered to another electronic device (e.g., the destination node 102) in the second network 20.

Figure 2:
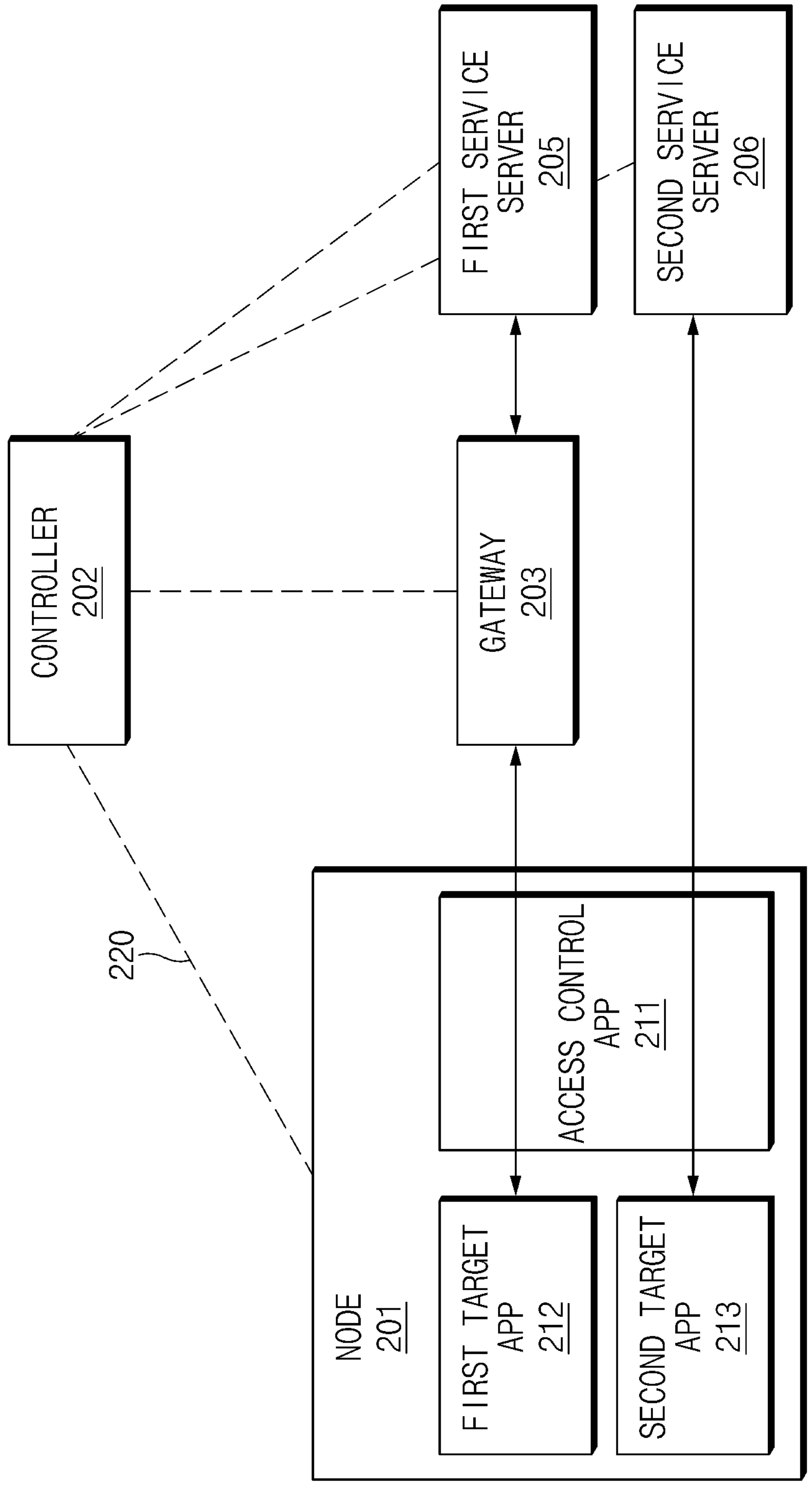
FIG. 2 illustrates an architecture in a network environment according to various embodiments.

FIG. 2 illustrates an architecture in a network environment according to various embodiments.

Referring to FIG. 2, a node 201 may be various types of devices capable of performing data communication. For example, the node 201 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. For example, the node 201 may include a server or a gateway capable of transmitting a data packet through an application. The node 201 may be referred to as an "electronic device" or a "terminal."

The node 201 may store a plurality of target applications (apps) 212 and 213 and an access control app 211. The first target app 212 may be controlled by the access control app 211 and may transmit a data packet to a first service server 205 through a gateway 203 or, conversely, may receive a data packet through the gateway 203. The second target app 213 may be controlled by the access control app 211 and transmit a data packet to a second service server 206 or, conversely, may receive a data packet. Because one of the target apps 212 and 213 is able to be a web browser or a trusted and/or secure application, such as a business app, whereas the other of the target apps 212 and 213 is able to be an untrusted or insecure malicious program, a network access system according to embodiments may provide a structure for transmitting only a data packet in which a logical connection is generated.

According to an embodiment, an accessibility control technology using a logical connection may generate a logical connection (e.g., a TCP session or a UDP session) for accessing the service servers 205 and 206. The access control app 211 which is present in the node 201 may provide a structure for preventing an unauthorized application from transmitting a data packet to an unauthorized destination and transmitting only the authorized data packet through the logical connection generated between the service servers 205 and 206.

The controller 202 may be, for example, a server (or a cloud server). The controller 202 may manage data transmission between the node 201, the gateway 203, and the service server 205, 206 to ensure trusted data transmission in the network environment. For example, the controller 202 may grant network access of the node 201 (or the access control app 211) authorized by means of policy information or blacklist information.

According to an embodiment, the controller 202 may transmit and receive a control data packet with the access control app 211 to perform various operations (e.g., registration, grant, authentication, update, and end) associated with network access of the node 201 or the access control app 211. Flow (e.g., 220) in which the control data packet is transmitted may be referred to as "control flow".

According to an embodiment, the controller 202 may provide a control scheme to control network access of the target apps 212 and 213 and a logical connection and for only an authorized application to transmit a data packet to an authorized service server and may immediately collect the logical connection, when the target apps 212 and 213 are ended or depending on a security event received from an interworking system to maintain a secure network state.

The gateway 203 may be located at the boundary of a network to which the node 201 belongs or the boundary of a network to which the service servers 205 and 206 belong. According to an embodiment, the gateway 203 may be connected with the controller 202 based on a cloud. The gateway 203 may forward only an authorized data packet among the data packets received from the access control app 211 to the first service server 205. Flow in which the data packet is transmitted between the access control app 211 and the gateway 203 may be referred to as "data flow." The data flow may be generated in more detailed units (e.g., for each application) as well as for each node or IP. The gateway 203 may forward only a data packet transmitted through a session among the data packets transmitted from the access control app 211 to the first service server 205, thus previously blocking indiscriminate network access.

According to various embodiments, the node 201 may include the access control app 211 for managing network access of the target apps 212 and 213 stored in the node 201 and a network driver (not shown). For example, when an access event of the target apps 212 and 213 included in the node 201 to the service servers 205 and 206 occurs, the access control app 211 may determine whether they are accessible to the target apps 212 and 213. When they are accessible to the target apps 212 and 213, the access control app 211 may transmit a data packet to the gateway 203 or the second service server 206 through the session. The access control app 211 may control transmission of a data packet by means of a kernel including an operating system in the node 201 and a network driver.

Figure 3:
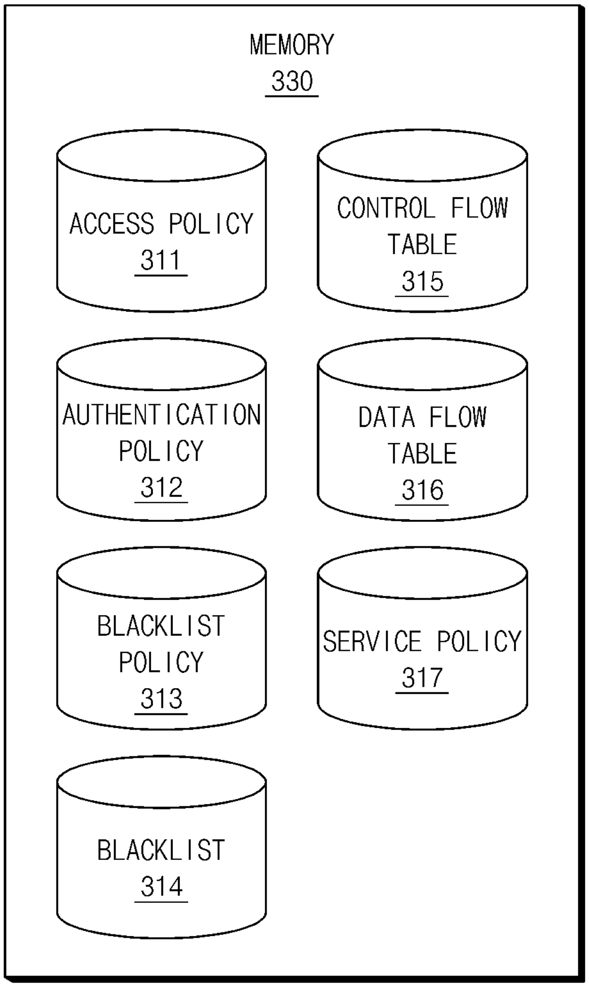
FIG. 3 is a functional block diagram illustrating a database stored in a controller according to various embodiments.

FIG. 3 is a functional block diagram illustrating a database stored in a controller according to various embodiments. FIG. 3 illustrates only a memory 330, but a controller 202 may further include a communication circuit (e.g., a communication circuit 430 of FIG. 4) for performing communication with an external electronic device and a processor (e.g., a processor 410 of FIG. 4) for controlling the overall operation of the controller 202.

An administrator may access the controller 202 and may set a connection-oriented policy for controlling access between an access control app 211 and service servers 205 and 206, thus controlling more precise and secure network access than managing a session at a service stage.

An access policy database 311 may include information about an identified network, a network accessible to a node or an application, and/or a service. For example, when the access control app 211 requests network access, the controller 202 may determine whether a network identified based on a policy of the access control database 311 (e.g., a network to which a node 201 belongs), a node, a user (e.g., a user of the node 201), and/or an application (e.g., the target apps 212 and 213 included in the node 201) are/is able to access the service servers 205 and 206. In an embodiment, the controller 202 may generate a whitelist of the target apps 212 and 213 which are able to access a specific service (e.g., an IP and a port) based on the access policy database 311.

An authentication policy database 312 may set whether to authenticate flow of a data packet associated with a network access request between a source node and a destination node on a connection path depending on an access policy and a series of policies associated with an authentication scheme when performing the authentication. According to an embodiment, authentication information included in a data flow header, which is inserted into a data packet by the node 201, a gateway 203, or the service servers 205 and 206, may be generated based on the authentication policy database 312.

A blacklist policy database 313 may indicate a blacklist registration policy for blocking access of a target (e.g., at least one of a terminal identifier (ID), an IP address, a media access control (MAC) address, a user ID) identified by means of a risk level of a security event among security events collected on a periodic basis from the node 201 or the gateway 203, a cycle of occurrence, and/or a behavior analysis.

A blacklist database 314 may include a list of targets blocked by the blacklist policy database 313. For example, when identification information of the node 201 which requests network access is included in the blacklist database 314, the controller 202 may deny the network access request to isolate the node 201.

A control flow table 315 is an example of a session table for managing flow (e.g., control flow) of a control data packet generated between the node 201 and the controller 202. When the node 201 successfully accesses the controller 202, control flow information may be generated by the controller 202. The control flow information may include at least one of identification information of control flow, an IP address identified when accessing and authenticating the controller 202, a node ID, or a user ID. For example, when access to the service servers 205 and 206 is requested from the node 201, the controller 202 may search for control flow information by means of the control flow identification information received from the node 201 and may map at least one of the IP address, the node ID, or the user ID included in the found control flow information to the access policy database 311, thus determining whether the node 201 is able to access the service servers 205 and 206.

According to an embodiment, the control flow may have an expiration time. The node 201 should update the expiration time of control flow. When the expiration time is not updated during a certain time, the control flow (or control flow information) may be removed. Furthermore, when it is determined to need to immediately block access depending on a security event collected from the node 201, the controller 202 may remove the control flow depending on an access end request of the node 201. When the control flow is removed, because the previously generated data flow is also removed, access of the node 201 may be blocked.

A data flow table 316 may be a table for managing flow (e.g., data flow) in which a detailed data packet is transmitted between the node 201, the gateway 203, and the service servers 205 and 206. The data flow may be generated for each TCP session, for each application, or in more detailed units. The data flow table 316 may include an application ID for identifying whether a data packet transmitted from the source is an authorized data packet, a destination IP address, and/or a service port. Because target apps 212 and 213 of the node 201 are able to generate a session with one or more gateways 203 or the service servers 205 and 206, the data flow table 316 may be managed based on a control flow ID. Furthermore, the data flow table 316 may include authorized target information for determining whether to forward a data packet based on a source IP, a destination IP, and port information of the data packet and state information including whether data flow is valid.

According to an embodiment, the data flow table 316 may include authentication information. For example, the authentication information may be a series of pieces of information for identifying whether an authorized node transmits a data packet, which may include a scheme for inserting authentication information for each transport protocol (e.g., a scheme for inserting a TCP SYN packet for a TCP, a scheme for inserting authentication information for each data packet for a UDP, or a scheme for inserting authentication information at a certain interval (or period) for the UDP), information for encrypting and decrypting authentication information, algorithm information for generating and verifying authentication information, a series of pieces of information included in an algorithm (e.g., information such as a secret key when an HMAC OTP is generated), or authentication information including whether a source IP is authenticated. According to an embodiment, the authentication information may be determined (or generated) based on the authentication policy database 312.

According to an embodiment, the data flow table 316 may include service information. For example, the service information may include a service IP and port information accessible to an authorized access target through a proxy, protocol information (e.g., the hyper text transfer protocol (HTTP), the file transfer protocol (FTP), an IoT-specific protocol, or the like), whether there is a need to filter a service request, a service request filtering processing scheme, or filtering information (e.g., personal information or harmful service request information). According to an embodiment, the service information may be generated based on a service policy database 317.

According to an embodiment, the data flow table 316 may be stored in the node 201, the gateway 203, or the service servers 205 and 206 in the same manner.

The service policy database 317 may include a service IP and port information accessible to an access target (e.g., a node or an access relay application) through a proxy (e.g., the proxy 213 included in the router 201) depending on the access policy database 311 or protocol information (e.g., the HTTP, the FTP, the IoT-specific protocol, or the like). According to an embodiment, the service policy database 317 may include whether there is a need to filter a service request, a service request filtering processing scheme, or filtering information (e.g., personal information or harmful service request information) and may include a series of pieces of information for the proxy to block an unnecessary or dangerous service request in advance.

Figure 4:
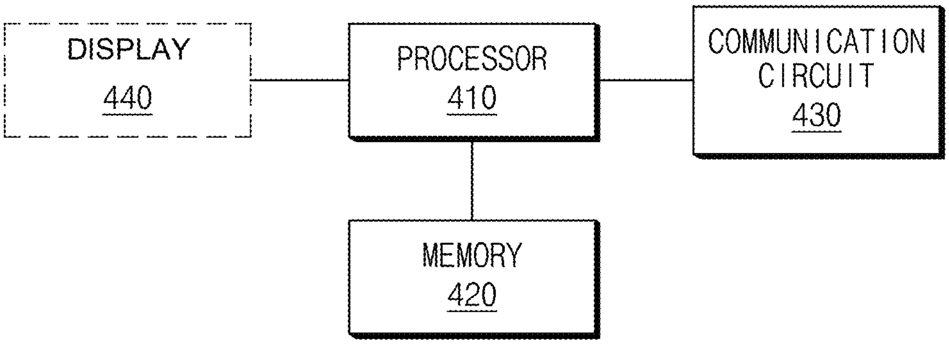
FIG. 4 illustrates a functional block diagram of a node according to various embodiments.

FIG. 4 illustrates a functional block diagram of a node according to various embodiments.

Referring to FIG. 4, the node may include a processor 410, a memory 420, and a communication circuit 430. According to an embodiment, the node may further include a display 440 for performing an interface with a user.

The processor 410 may control the overall operation of the node. In various embodiments, the processor 410 may include one processor single core or may include a plurality of processor cores. For example, the processor 410 may include a multi-core such as a dual-core, a quad-core, or a hexa-core. According to embodiments, the processor 410 may further include a cache memory located internally or externally. According to embodiments, the processor 410 may be configured with one or more processors. For example, the processor 410 may include at least one of an application processor, a communication processor, or a graphical processing unit (GPU).

All or a portion of the processor 410 may be electrically or operatively coupled with or connected to another component (e.g., the memory 420, the communication circuit 430, or the display 440) in the node. The processor 410 may receive commands of other components of the node, may interpret the received commands, and may perform calculation or may process data, depending on the interpreted commands. The processor 410 may interpret and process a message, data, an instruction, or a signal received from the memory 420, the communication circuit 430, or the display 440. The processor 410 may generate a new message, data, instruction, or signal based on the received message, data, instruction, or signal. The processor 410 may provide the memory 420, the communication circuit 430, or the display 400 with the processed or generated message, data, instruction, or signal.

The processor 410 may process data or a signal which is generated or occurs by a program. For example, the processor 410 may request an instruction, data, or a signal from the memory 420 to run or control the program. The processor 410 may record (or store) or update an instruction, data, or a signal in the memory 420 to run or control the program.

The memory 420 may store an instruction to control the node, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multi media card (eMMC), or universal flash storage (UFS).

According to an embodiment, the memory 420 may store target apps 212 and 213 and an access control app 211 of FIG. 2. The access control app 211 may perform a function of generating network access and a session with a gateway 203 or service servers 205 and 206 and generating and updating control flow with the controller 202. To this end, the access control app 211 may include one or more security modules.

According to an embodiment, the memory 420 may store some of pieces of information included in a memory (e.g., a memory 330 of FIG. 3) of the controller. For example, the memory 420 may store a data flow table 316 described in FIG. 3.

The communication circuit 430 may assist in establishing a wired or wireless communication connection between the node and an external electronic device (e.g., a controller 202, the gateway 203, or the service servers 205 and 206 of FIG. 2) and performing communication through the established connection. According to an embodiment, the communication circuit 430 may include a wireless communication circuit (e.g., a cellular communication circuit, a short range wireless communication circuit, or a global navigation satellite system (GNSS) communication circuit) or a wired communication circuit (e.g., a local area network (LAN) communication circuit or power line communication circuit) and may communicate with the external electronic device over a short range communication network, such as Bluetooth, Wi-Fi direct, or infrared data association (IrDA), or a long range communication network, such as a cellular network, the Internet, or a computer network, using the corresponding communication circuit among them. The above-mentioned several types of communication circuits 430 may be implemented as one chip or may be respectively implemented as separate chips.

The display 440 may output content, data, or a signal. In various embodiments, the display 440 may display image data processed by the processor 410. According to embodiments, the display 440 may be coupled with a plurality of touch sensors (not shown) capable of receiving a touch input or the like to be configured with an integrated touch screen. When the display 440 is configured with the touch screen, the plurality of touch sensors may be arranged over the display 440 or under the display 440.

Meanwhile, a server (e.g., the controller) according to an embodiment may include the processor 410, the memory 420, and the communication circuit 430. The processor 410, the memory 420, and the communication circuit 430 included in the server may be substantially the same as the processor 410, the memory 420, and the communication circuit 430, which are described above.

Furthermore, the gateway 203 according to an embodiment may include the processor 410, the memory 420, and the communication circuit 430. The processor 410, the memory 420, and the communication circuit 430 included in the gateway 203 may be substantially the same as the processor 410, the memory 420, and the communication circuit 430, which are described above.

Figure 5:
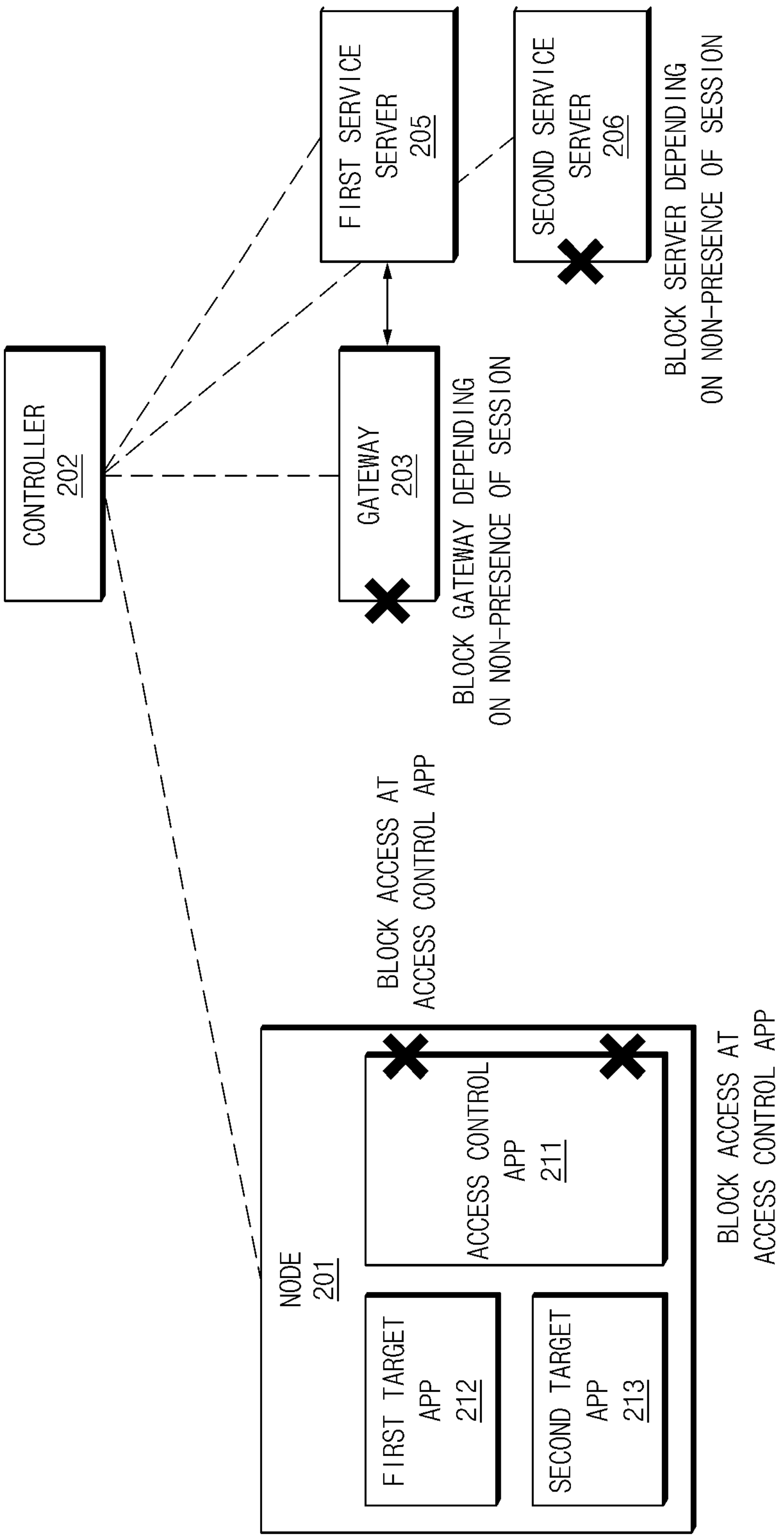
FIG. 5 illustrates an operation of controlling transmission of a data packet according to various embodiments.

FIG. 5 illustrates an operation of controlling transmission of a data packet according to various embodiments.

Referring to FIG. 5, an access control app 211 may detect a network access request for a first service server 205 from a first target app 212 included in a node 201 and may determine whether the node 201 or the access control app 211 accesses a controller 202. When the node 201 or the access control app 211 does not access the controller 202, the access control app 211 may block transmission of a data packet in a kernel including an operating system or a network driver. By means of the access control app 211, the node 201 may previously block access of a malicious application in an application layer among OSI layers.

In an embodiment, when the access control app 211 does not access the controller 202 or when a logical connection between the access control app 211 or target apps 212 and 213 and the first service server 205 is not generated, the data packet transmitted from the access control app 211 may be blocked by a gateway 203 and the service servers 205 and 206 and the access control app 211 may only request access from the controller 202.

In an embodiment, when the access control app 211 is not installed in the node 201 or when the malicious application bypasses control of the access control app 211, an unauthorized data packet may be transmitted from the node 201. In this case, because the gateway 203 which is present at the boundary of the network blocks a data packet in which the logical connection is not present and a data packet in which data flow is not present, the data packet transmitted from the node 201 (e.g., a data packet for generating a TCP session) may fail to reach the first service server 205. In other words, the node 201 may be isolated from the first service server 205.

According to an embodiment, a second service server 206 may block a data packet in which the logical connection is not present.

Figure 6:
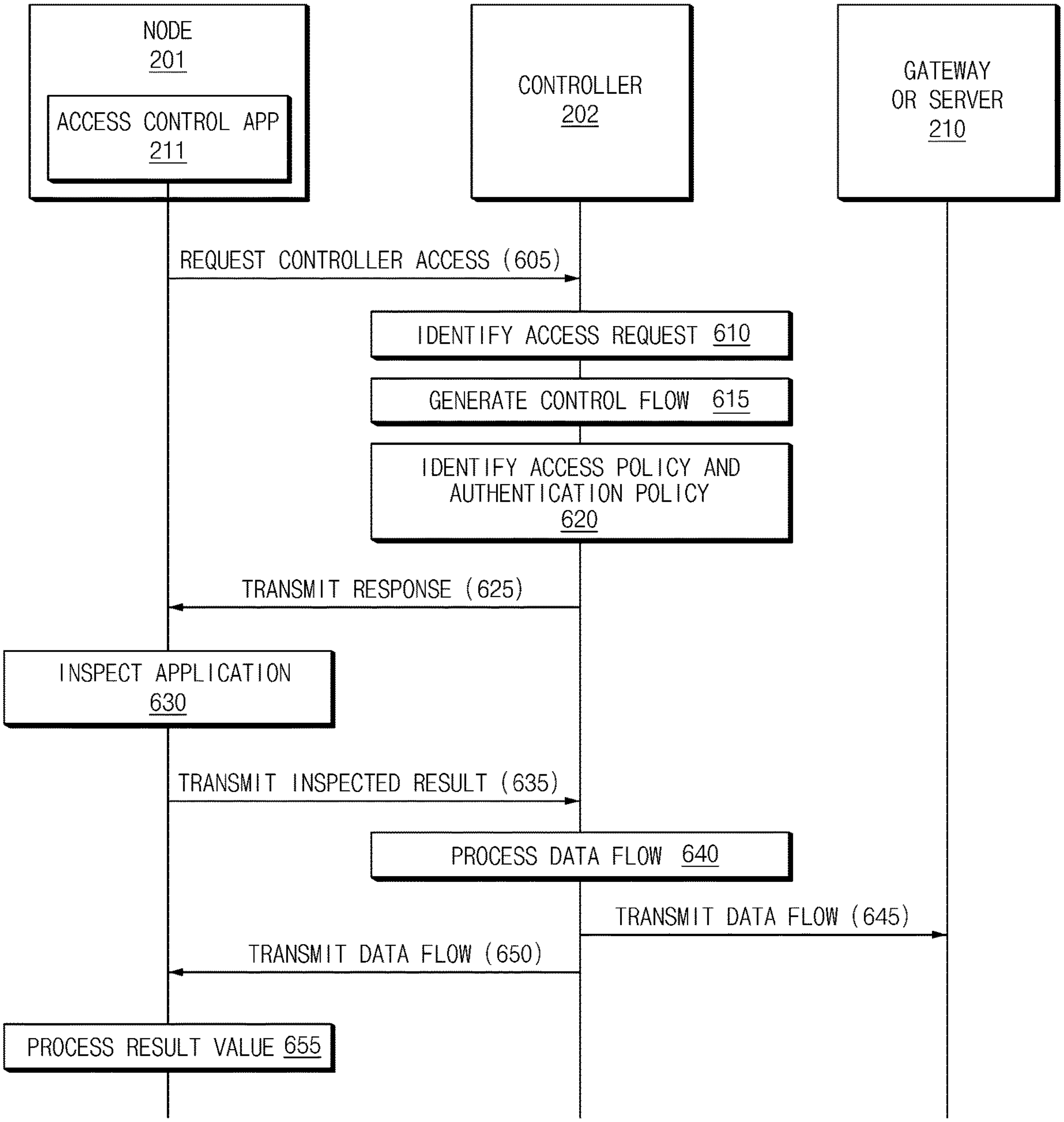
FIG. 6 illustrates a signal sequence diagram for controller access according to various embodiments.

FIG. 6 illustrates a signal sequence diagram for controller access according to various embodiments.

Because a node 201 is required to be authorized by a controller 202 to access or receive a network, an access control app 211 of the node 201 may request the controller 202 to generate control flow, thus attempting controller access of the node 201.

According to an embodiment, a gateway or server 210 of FIG. 6 may include a gateway 203 or service servers 205 and 206 of FIG. 2.

Referring to FIG. 6, the node 201 may detect a controller access event. For example, when the access control app 211 is installed and run in the node 201, the node 201 may detect that access to the controller 202 is requested.

In operation 605, the node 201 may request controller access from the controller 202. For example, the access control app 211 may transmit identification information of the access control app 211 to the controller 202. In addition, the access control app 211 may further transmit identification information (e.g., a terminal ID, an IP address, or a MAC address) of the node 201, a type of the node 201, a location of the node 201, an environment of the node 201, identification information of a network to which the node 201 belongs, and/or any identification information internally generated by a network system.

In operation 610, the controller 202 may identify whether it is accessible to a target (e.g., the access control app 211 or the node 201) which requests controller access. According to an embodiment, the controller 202 may identify whether it is accessible to the target which requests the controller access based on at least one of whether information received from the node 201 is included in an access policy database 311 or whether identification information of the node 201, identification information of a network to which the node 201 belongs, and/or identification information of the access control app 211 are/is included in a blacklist database 314.

When it is accessible to the target, in operation 615, the controller 202 may generate control flow between the node 201 (or the access control app 211) and the controller 202. In this case, the controller 202 may generate control flow identification information in the form of a random number and may store identification information of at least one of the node 201, the network to which the node 201 belongs, or the access control app 211 in a control flow table 315. The information stored in the control flow table 315 may be used for policy identification and/or validation for user authentication of the node 201, an information update of the node 201, or network access of the node 201.

In operation 620, the controller 202 may generate whitelist information of an application accessible from the access policy database 311 and an authentication policy database 312 corresponding to the identified information (e.g., information of the node 201 or information of a source network to which the node 201 belongs). In an embodiment, in operation 625, the controller 202 may transmit the application whitelist to the access control app 211.

In operation 625, the controller 202 may transmit control flow identification information to the node 201 in response to the controller access request. According to an embodiment, when it is inaccessible to the target which requests the controller access or the target is included in a blacklist, the controller 202 may fail to generate control flow and may transmit inaccessible information in operation 625. In an embodiment, the controller 202 may transmit the application whitelist generated by performing operation 620 to the access control app 211.

In operation 630, the access control app 211 may inspect the application. For example, the access control app 211 may inspect the application based on an accessible application whitelist received from the controller 202. The access control app 211 may identify whether the application is present (or installed) in the node 201 based on the accessible application information and may inspect whether there are integrity and stability of the application which is present (or whether the application is forged or falsified, code signing, or a fingerprint) depending on a validation policy.

In operation 635, the access control app 211 may transmit the result of inspecting the application to the controller 202. For example, the access control app 211 may transmit information of the application which is present and the result of the validation to the controller 202.

In operation 640, the controller 202 may inspect whether the application is valid based on the received application information. When the application is the valid application, the controller 202 may generate data flow such that the node 201 is able to transmit a data packet without a network access request procedure based on an access policy and an authentication policy to previously grant access of the node 201.

According to an embodiment, the data flow may include transport protocol information, a source IP, a destination IP, port information, and authentication information including a scheme for inserting authentication information for each transport protocol (e.g., a scheme for inserting a TCP SYN packet for a TCP, a scheme for inserting authentication information for each data packet for a UDP, or a scheme for inserting authentication information at a certain interval (or period) for the UDP) when a data packet is authenticated, information for encrypting and decrypting authentication information, algorithm information for generating and verifying authentication information, a series of pieces of information (e.g., information such as a secret key when an HMAC OTP is generated or the like), or whether a source IP is authenticated.

In operations 645 and 650, the controller 202 may transmit the generated data flow to the gateway or server 210 and the access control app 211.

In operation 655, the access control app 211 may process a result value according to the received response. For example, the access control app 211 may store the received control flow identification information and may display a user interface screen indicating that the controller access is completed to a user. When the controller access is completed, the network access request of the node 201 for a destination network may be controlled by the controller 202.

According to another embodiment, the controller 202 may determine that it is inaccessible to the node 201. For example, when the identification information of the node 201 and/or identification information of the network to which the node 201 belongs is included in a blacklist database, the controller 202 may determine that it is inaccessible to the node 201. In this case, the controller 202 may fail to generate control flow in operation 615 and may transmit a response indicating that the controller access is impossible in operation 625. Furthermore, in this case, operations 630 to 650 may fail to be performed. According to an embodiment, when there is a need to reattempt controller access, the access control app 211 may perform operation 605 again.

Furthermore, when there is the data flow received from the controller 202, the access control app 211 may update the data flow of the node 201 and may manage the data flow to transmit a data packet based on the data flow previously authorized upon network access.

According to an embodiment, when it is determined that there is no need to inspect the application, operations 630 to 650 may fail to be performed.

Figure 7:
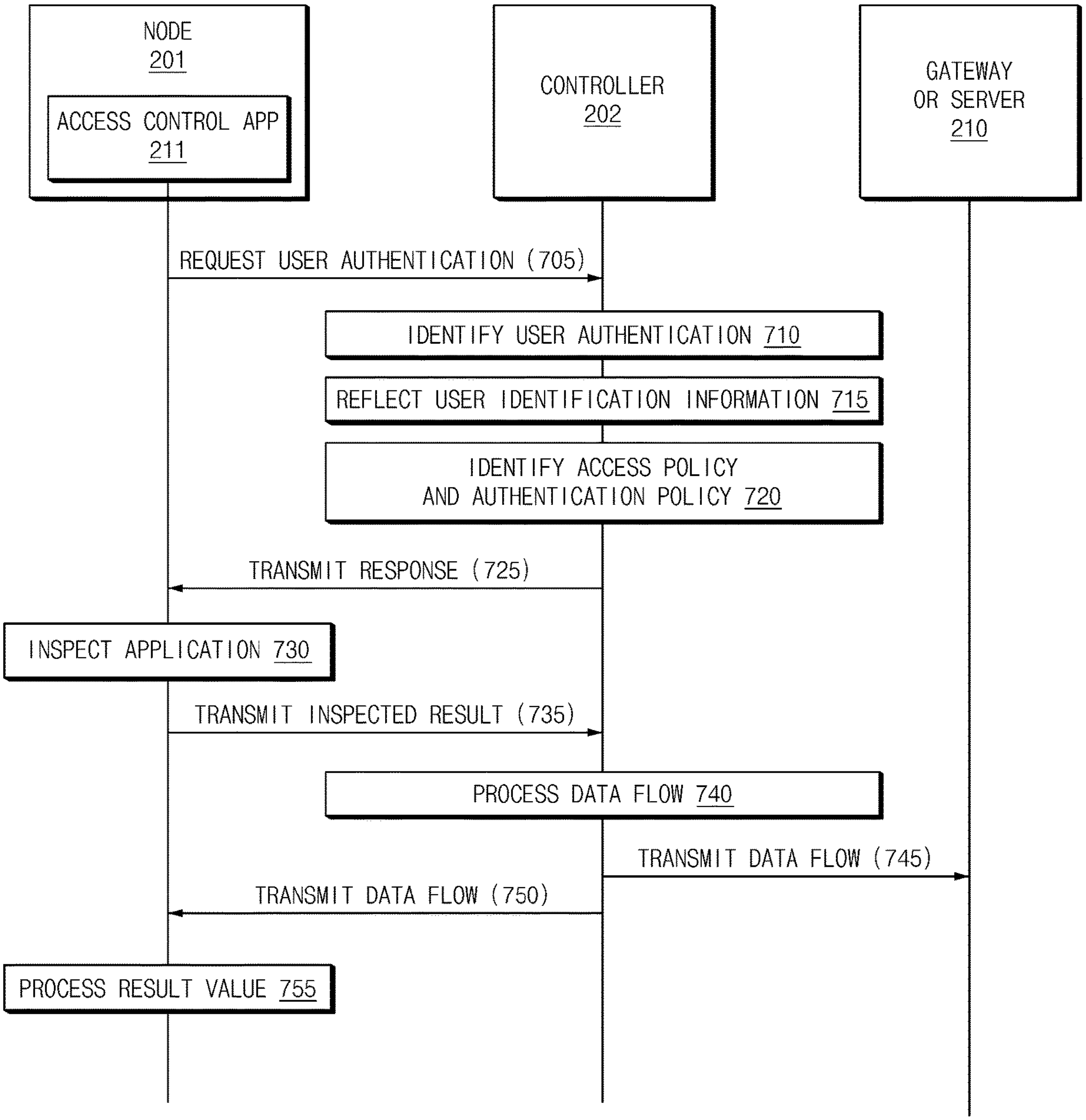
FIG. 7 illustrates a signal sequence diagram for user authentication according to various embodiments.

FIG. 7 illustrates a signal sequence diagram for user authentication according to various embodiments.

For a node 201 to be assigned detailed access privilege for a destination network, an access control app 211 of the node 201 may be authenticated for a user of the node 201 from a controller 202.

Referring to FIG. 7, the node 201 may receive an input for user authentication. The input for user authentication may be, for example, a user input for inputting a user ID and a password. For another example, the input for user authentication may be a user input (e.g., biometric information) for more reinforced authentication. In this case, in operation 705, the access control app 211 may request user authentication from the controller 202. When control flow between the node 201 and the controller 202 is already generated, the access control app 211 may transmit the input information for user authentication together with control flow identification information.

In operation 710, the controller 202 may authenticate the user based on the information received from the node 201. For example, the controller 202 may determine whether it is accessible to the user depending on an access policy and whether the user is included in a blacklist based on a user ID, a password, and/or reinforced authentication information, which are included in the received information, and a database (e.g., an access policy database 311 or a blacklist database 314 of FIG. 3) included in a memory of the controller 202.

When the user is authenticated, in operation 715, the controller 202 may add identification information (e.g., a user ID) of the user to identification information of control flow. The added user identification information may be used for controller access or network access of the authenticated user.

In operation 720, the controller 202 may generate accessible application information based on an access policy database 311 or an authentication policy database 312. For example, the accessible application information may be an application whitelist generated based on an access policy.

In operation 725, the controller 202 may transmit information indicating that the user is authenticated to the node 201 in response to the user authentication request. Furthermore, the controller 202 may deliver the accessible application information to the access control app 211.

In operation 730, the access control app 211 may inspect the application. For example, the access control app 211 may inspect the application based on an accessible application whitelist received from the controller 202. The access control app 211 may identify whether the application is present (or installed) in the node 201 based on the accessible application information and may inspect whether there are integrity and stability of the application which is present (or whether the application is forged or falsified, code signing, or a fingerprint) depending on a validation policy.

In operation 735, the access control app 211 may transmit the result of inspecting the application to the controller 202. For example, the access control app 211 may transmit information of the application which is present and the result of the validation to the controller 202.

In operation 740, the controller 202 may inspect whether the application is valid based on the received application information. When the application is the valid application, the controller 202 may generate data flow such that the node 201 is able to transmit a data packet without a network access request procedure based on an access policy and an authentication policy to previously grant access of the node 201.

According to an embodiment, the data flow may include transport protocol information, a source IP, a destination IP, port information, and authentication information including a scheme for inserting authentication information for each transport protocol (e.g., a scheme for inserting a TCP SYN packet for a TCP, a scheme for inserting authentication information for each data packet for a UDP, or a scheme for inserting authentication information at a certain interval (or period) for the UDP) when a data packet is authenticated, information for encrypting and decrypting authentication information, algorithm information for generating and verifying authentication information, a series of pieces of information (e.g., information such as a secret key when an HMAC OTP is generated or the like), or whether a source IP is authenticated.

In operations 745 and 750, the controller 202 may transmit the generated data flow to the gateway or server 210 and the access control app 211.

In operation 755, the access control app 211 may process a result value according to the received response. For example, the access control app 211 may store the received control flow identification information and may display a user interface screen indicating that the user authentication is completed to a user. When the user authentication is completed, the network access request of the node 201 for a destination network may be controlled by the controller 202.

According to another embodiment, the controller 202 may determine that user authentication of the node 201 is impossible. For example, when the identification information of the node 201 and/or the identification information of the network to which the node 201 belongs are/is included in a blacklist database, the controller 202 may determine that it is inaccessible to the node 201 and the user authentication is impossible. In this case, the controller 202 may fail to inflect user identification information in operation 715 and may transmit a response indicating that the controller access is impossible in operation 725. Furthermore, in this case, operations 730 to 750 may fail to be performed.

Furthermore, when there is the data flow received from the controller 202, the access control app 211 may update the data flow of the node 201 and may manage the data flow to transmit a data packet based on the data flow previously authorized upon network access.

According to an embodiment, when there is no need to inspect the application, operations 730 to 750 may fail to be performed.

Figure 8:
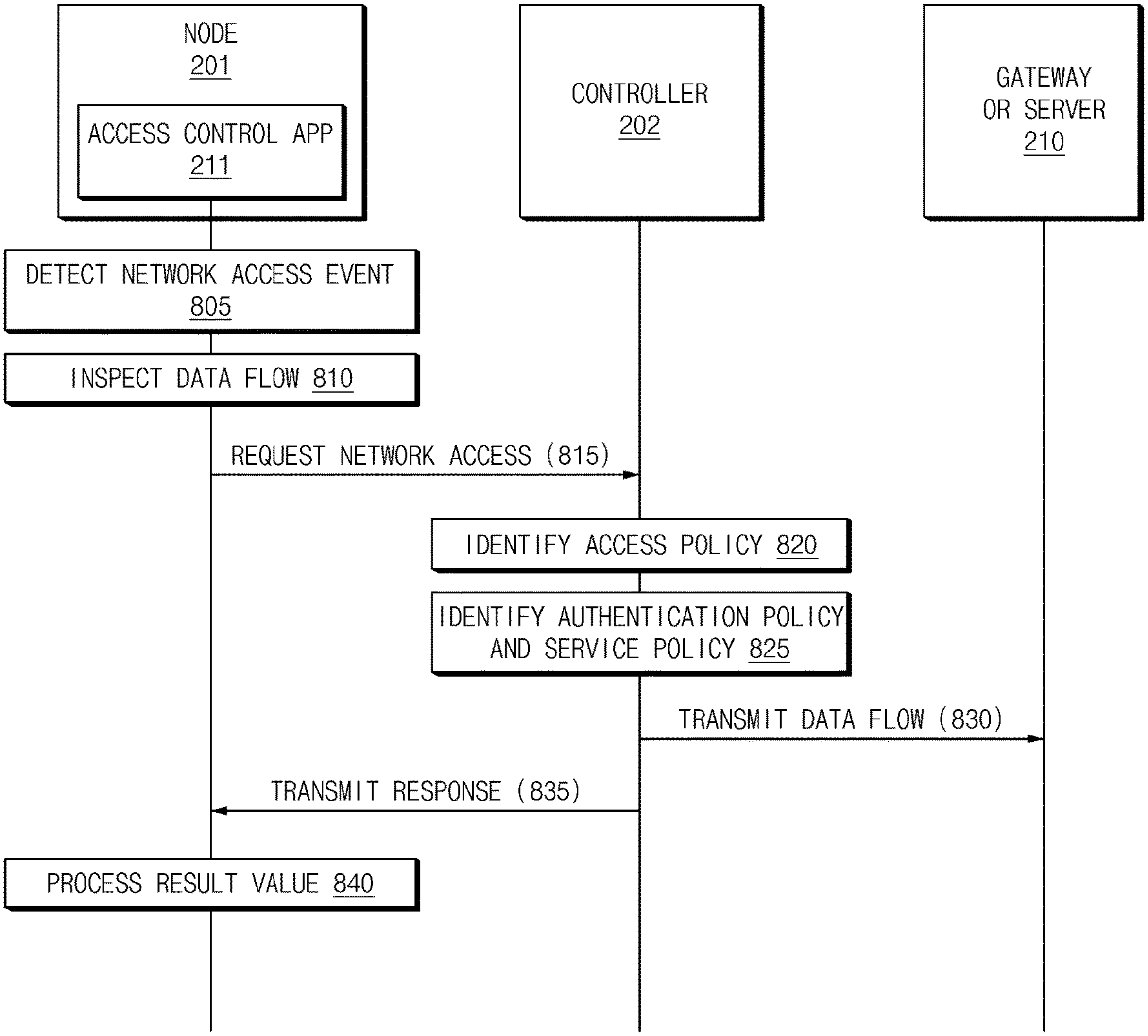
FIG. 8 illustrates a signal sequence diagram for network access according to various embodiments.

FIG. 8 illustrates a signal sequence diagram for network access according to various embodiments.

After a node 201 is authorized from a controller 202, it may control network access of other applications stored in the node 201 by means of an access control app 211 of the node 201, thus ensuring trusted data transmission.

In operation 805, the access control app 211 may detect a network access event of another application (e.g., a target application 212 or 213 of FIG. 2) stored in the node 201.

In operation 810, the access control app 211 may identify presence of data flow corresponding to identification information of an application which requests network access, identification information of a destination network, and port information of the destination network. According to an embodiment, when the data flow is present and is not valid, the access control app 211 may drop a data packet. According to another embodiment, when the data flow is present, the access control app 211 may transmit the data packet based on the data flow. According to an embodiment, the access control app 211 of the node 201 may not perform operation 810 and may perform a network access request in operation 815.

When the data flow is not present or when the data flow should be updated, for example, when there is a need to update the data flow as an authentication time expires, in operation 815, the access control app 211 may request network access from the controller 202. For example, the network access request may include transport protocol information, identification information of a target app, control flow identification information, the identification information of the destination network, and the port information of the destination network.

In operation 820, the controller 202 may identify whether identification information for requesting access (e.g., the identification information of the destination and the port information of the target network) and whether the destination network is accessible, in an access policy corresponding to information identified based on the control flow identification information (e.g., node, user, or source network identification information). According to an embodiment, the controller 202 may identify whether the target app is able to access a gateway or service server 210. According to an embodiment, when the network access is impossible, in operation 835, the controller 202 may transmit an inaccessible result to the access control app 211 of the node 201.

When the network access is possible, in operation 825, the controller 202 may identify whether to authenticate a data packet and an authentication scheme, based on an authentication policy database 312 to access the destination network. Furthermore, the controller 202 may identify whether there is accessible data flow based on a data flow table 316 and may generate data flow when there is no accessible data flow. According to an embodiment, the data flow may include transport protocol information, a source IP, a destination IP, port information, and authentication information including a scheme for inserting authentication information for each transport protocol (e.g., a scheme for inserting a TCP SYN packet for a TCP, a scheme for inserting authentication information for each data packet for a UDP, or a scheme for inserting authentication information at a certain interval (or period) for the UDP) when a data packet is authenticated, information for encrypting and decrypting authentication information, algorithm information for generating and verifying authentication information, a series of pieces of information (e.g., information such as a secret key when an HMAC OTP is generated or the like), or whether a source IP is authenticated.

According to an embodiment, the data flow may include a domain, a URL, a service IP, and port information the application of the node 201 is able to access through a proxy included in a gateway or server 210, protocol information (e.g., the HTTP, the FTP, an IoT-specific protocol, or the like), whether there is a need to filter a service request, a service request filtering processing scheme, or filtering information (e.g., personal information or harmful service request information) and may further include a series of pieces of information for the proxy to previously block an unnecessary or dangerous server request.

According to an embodiment, when generating data flow, the controller 202 may further include authentication information, including a scheme for inserting authentication information upon a service request (e.g., a scheme for inserting a TCP SYN packet for a TCP, a scheme for inserting authentication information for each data packet for a UDP, or a scheme for inserting authentication information at a certain interval (or period) for the UDP), information for encrypting and decrypting authentication information, algorithm information for generating and verifying authentication information, and a series of pieces of information (e.g., information such as a secret key when an HMAC OTP is generated or the like), and header information to be removed when returning a service request, as information necessary for a gateway 203 to insert a data flow header capable of being identified by an application processing layer in a network transport layer.

According to an embodiment, in operations 830 and 835, the controller 202 may transmit the generated data flow to the gateway or server 210 and the access control app 211. According to an embodiment, when the network access is impossible, in operation 835, the controller 202 may transmit a network access impossibility result to the access control app 211.

In operation 840, the access control app 211 of the node 201 may process a result value for the response received from the controller 202. For example, when receiving the network access impossibility result from the controller 202, the access control app 211 may drop a data packet to be transmitted by the target app. For another example, when the data flow is received from the controller 202, the access control app 211 may transmit a data packet based on the received data flow.

In an embodiment, after performing operation 810, the access control app 211 may perform validation for an access application depending on a validation policy. For example, the access control app 211 may further inspect whether there are integrity and stability of the access application (whether the application is forged or falsified, code signing, a fingerprint, or the like). When the result of the validation succeeds, the access control app 211 may perform operation 815.

Figure 9:
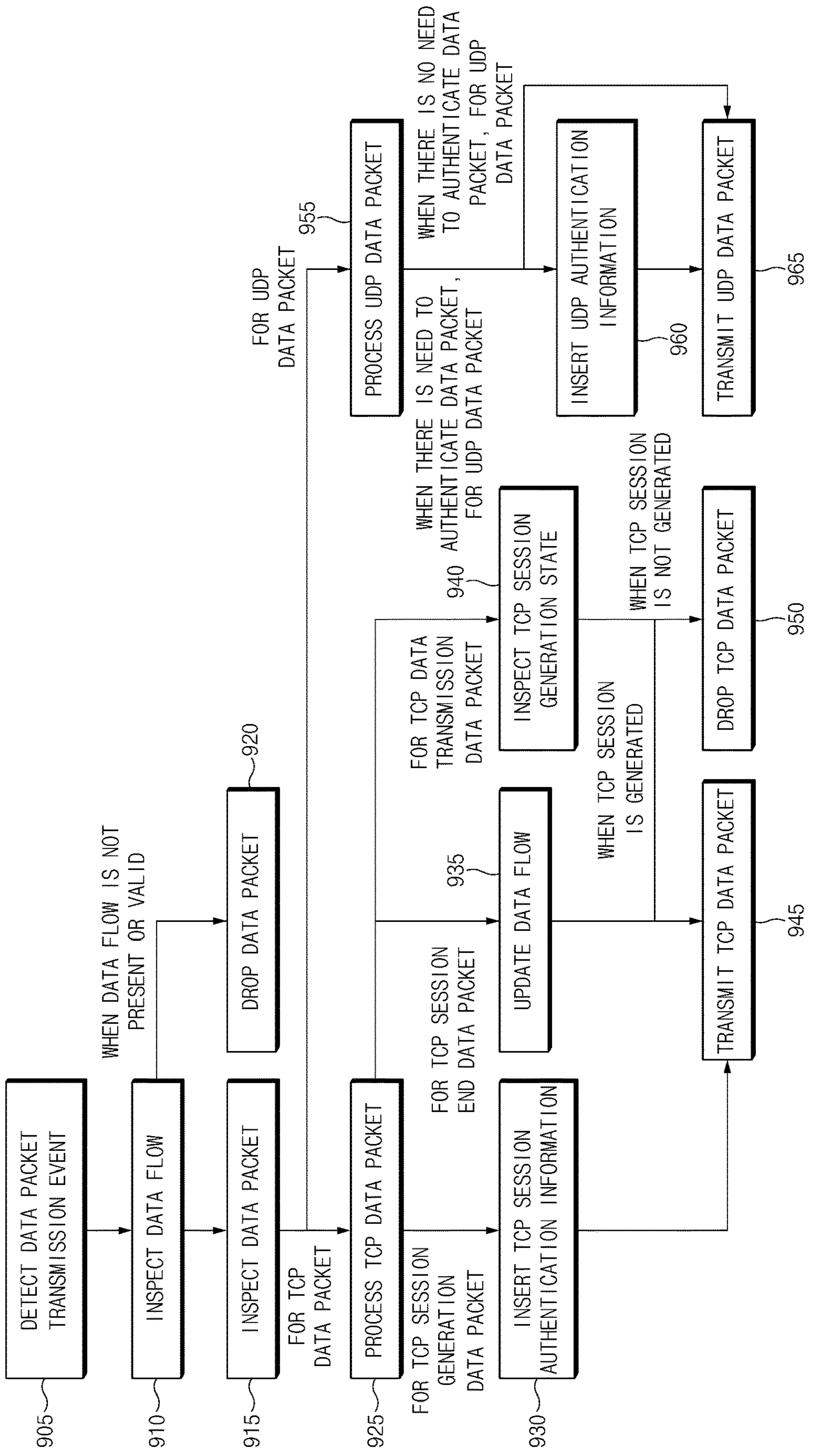
FIG. 9 illustrates an operational flowchart for transmitting a data packet of a source node according to various embodiments.

FIG. 9 illustrates an operational flowchart for transmitting a data packet of a source node according to various embodiments. According to an embodiment, operations shown in FIG. 9 may be performed by means of an access control app 211 of a source node 201 of FIG. 2.

After requesting network access, the source node 201 may insert authentication information into a data packet and may transmit the data packet to a destination node 205 to allow the destination node 205 to identify that the data packet received from the source node 201 is normal.

In operation 905, an access control app 211 may detect a data packet transmission event of a target app.

In operation 910, when the data packet is transmitted after initial network access is granted by a controller 202, the access control app 211 may identify whether there is data flow corresponding to a transport protocol of the transmitted data packet, an IP of the destination node 205, a port of the destination node 205, and an application. According to an embodiment, when there is no data flow, in operation 920, the access control app 211 may drop the data packet.

When there is the valid data flow, in operation 915, the access control app 211 may inspect a type of the data packet. For example, the access control app 211 may inspect whether the data packet is a TCP data packet or a UDP data packet, may perform TCP data packet processing (operation 925) when the data packet is the TCP data packet, and may perform UDP data packet processing (operation 955) when the data packet is the UDP data packet.

According to an embodiment, when the data packet is a TCP session generation data packet, in operations 930 and 945, the access control app 211 may insert authentication information into a TPC SYN packet and may transmit a data packet. For example, the operation of inserting the authentication information may be performed through operations shown in FIG. 10.

According to an embodiment, when receiving a TCP session generation complete data packet from a destination network after transmitting the TCP SYN packet, the access control app 211 may change state information of data flow corresponding to the data packet to a TCP session generation complete state to transmit a TCP-based data packet.

According to an embodiment, when the data packet is a TCP session end data packet, in operations 935 and 945, the access control app 211 may change state information of data flow to a TCP session generation end state not to transmit a TCP-based data packet (or an actual data packet) and may transmit a TCP session end data packet.

According to an embodiment, when the data packet is the TCP-based data packet (or the actual data packet), in operation 940, the access control app 211 may identify whether the generation of a TCP session is completed in the state information of the data flow. For example, when the generation of the TCP session is completed, in operation 945, the access control app 211 may transmit the data packet. For another example, when the generation of the TPC session is not completed, in operation 950, the access control app 211 may drop the data packet.

According to an embodiment, when the data packet is the UDP-based data packet, the access control app 211 may identify whether there is a need to authenticate the data packet, may insert and transmit authentication information into the data packet when there is the need to authenticate the data packet (operations 960 and 965), and may transmit the data packet without inserting the authentication information when there is no need to authenticate the data packet (operation 965). According to an embodiment, the insertion of the authentication information may be performed through operations shown in FIG. 10.

Figure 10:
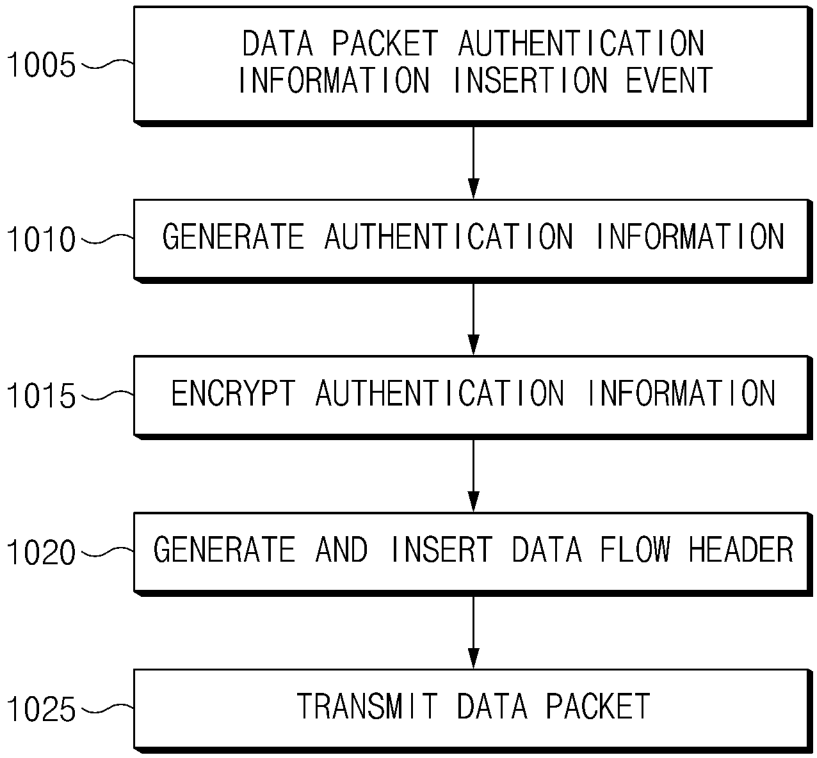
FIG. 10 illustrates an operational flowchart for inserting data packet authentication information of a node according to various embodiments.

FIG. 10 illustrates an operational flowchart for inserting data packet authentication information of a node according to various embodiments. According to an embodiment, operations shown in FIG. 10 may be performed by means of an access control app 211 of FIG. 2.

Referring to FIG. 10, in operation 1005, the access control app 211 may detect a data packet authentication information insertion event. In this case, based on authentication information of data flow corresponding to a data packet, the access control app 211 may identify whether to insert and transmit the authentication information into the data packet. According to an embodiment, when there is no need to insert the authentication information, in operation 1025, the access control app 211 may transmit the data packet without performing operations 1010 to 1020.

When there is the need to insert the authentication information, in operation 1010, the access control app 211 may generate the authentication information based on an authentication information generation algorithm and additional information included in the authentication information of the data flow.

In operation 1015, the access control app 211 may encrypt the authentication information using an encryption algorithm and an encryption key included in the authentication information of the data flow.

In operation 1020, the access control app 211 may combine the encrypted authentication information with identification information of the data flow to generate a data flow header and may insert the data flow header into the data packet depending on an authentication information insertion scheme included in the authentication information of the data flow. According to an embodiment, when a transport protocol is a TCP, the access control app 211 may insert the data flow header into a stage before a payload of a TCP SYN packet. According to an embodiment, when the transport protocol is a UDP, the access control app 211 may insert the data flow header into a stage before a payload of a UDP data packet.

According to an embodiment, for the UDP data packet, the access control app 211 may insert the data flow header into the data packet depending on the authentication information insertion scheme, for example, insert the data flow header into every UDP data packet based on data flow, insert the data flow header on a certain data packet basis or on a time basis, or insert the data flow header at a time point when flow of the data packet starts.

Figure 11:
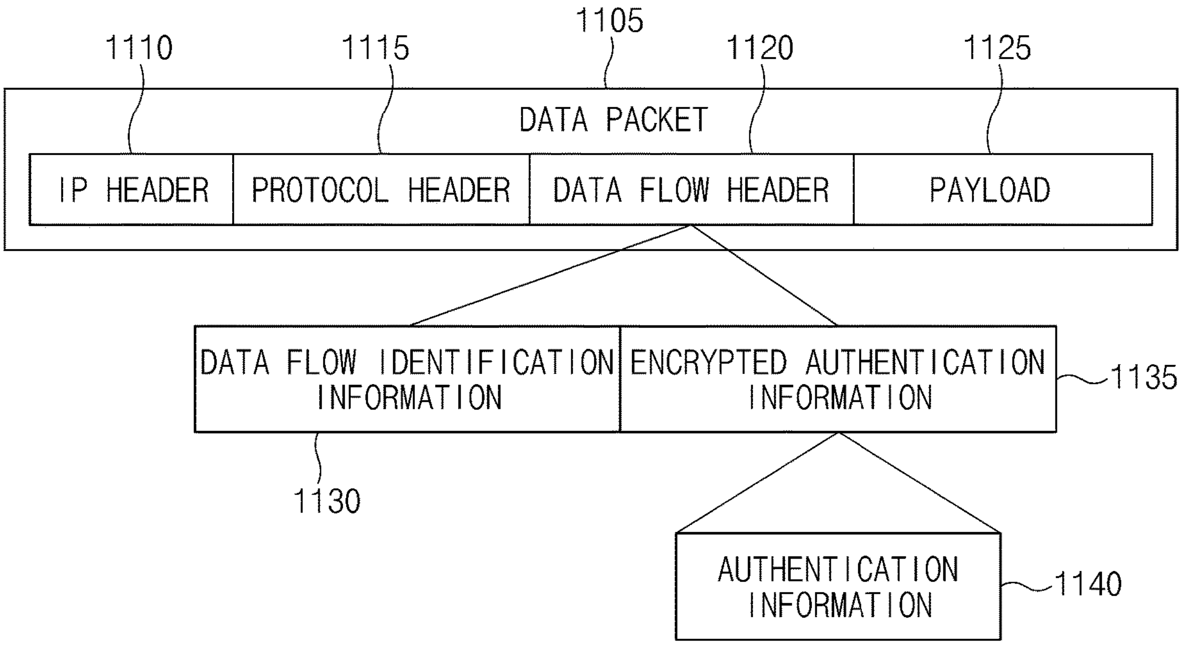
FIG. 11 illustrates an example of a data packet into which authentication information is inserted according to various embodiments.

FIG. 11 illustrates an example of a data packet into which authentication information is inserted according to various embodiments.

According to an embodiment, a data packet 1105 may be a TCP data packet and may be a UDP data packet.

When transmitting a TCP-based data packet, a target app should generate a TCP session with a destination node before transmitting a substantial data packet and an access control app 211 may insert a data flow header 1120 into a stage before a payload 1125 of a TCP SYN data packet 1105 for generating the TCP session in a 3-way handshake process for generating the TCP session. For example, the TCP SYN data packet 1105 may include an IP header 1110, a protocol header 1115, a data flow header 1120, and the payload 1125.

Thus, the access control app 211 may insert the data flow header 1120 into the TCP SYN data packet 105 for generating the TCP session and may authenticate it. Because the TCP session is generated for only the authenticated target and the TCP session is not generated when it is not authenticated, the access control app 211 may provide a more efficient TCP-based data packet control method than a scheme for inserting authentication information whenever transmitting all data packets of the TCP.

When transmitting a UDP-based data packet, there is no concept of generating a session like the TPC, the access control app 211 may manage an internal authentication time point for a UDP.

Based on authentication information of data flow received from a controller 202, the access control app 211 may insert data flow header information into a first data packet of flow of a UDP data packet which is continuously transmitted and may transmit the data packet, when transmitting the UDP-based data packet. Thereafter, the access control app 211 may transmit the data packet without inserting the data flow header information into the data packet or may insert a data flow header into all the UDP data packets when there is a need for strong data packet authentication.

The data flow header 1120 may be information inserted by the access control app 211 to identify whether there is a data packet capable of being transmitted from a gateway 203, based on the authentication information of the data flow received from the controller 202 in data packet flow between the target app and a destination node.

According to an embodiment, the data flow header 1120 may include data flow identification information 1130 and encrypted authentication information 1135. Furthermore, the encrypted authentication information 1135 may be decrypted to be authentication information 1140 and may be used to identify whether the data packet is transmitted from a normal target.

Because there is no information capable of being identified in a data packet on an IP network except for 5-tuple information (e.g., a protocol, a source IP and port, and a destination IP and port), it may not be seen whether a node which is assigned an IP is substantially authenticated and whether the data packet is transmitted by a target granted by an application which is a substantial communication entity. Thus, to identify that the data packet is a data packet transmitted from the authenticated target, the access control app 211 and the gateway 203 may perform basic data packet transmission control using data flow identification information, a destination IP, and port information, which are included in the data flow received from the controller 202.

Upon the data packet transmission control, the destination node may identify whether there is corresponding data flow based on the data flow identification information included in the data flow header and may compare a destination IP and port information included in the data flow information with a destination IP and port information included in the data packet to identify whether they are the same as each other, thus controlling only the authenticated target to access an authorized destination node based on the data flow identification information rather than a source IP.

According to an embodiment, for a UDP, the destination node may insert the data flow header into every data packet or may compare the data flow header with a source IP, thus identifying whether an authenticated target.

Furthermore, the structure for identifying the authenticated target by means of the data flow header may provide an effective method, when configuring a sub-network using a router, when it is unable to specify a source IP of a node, for example, when it is accessible to the node with mobility, and when controlling flow of a data packet for each substantial communication entity.

The encrypted authentication information 1135 of the data flow header 1120 may include the data flow identification information 1130 and may be used for the purpose of identifying whether an entity which transmits the data packet substantially transmits the data packet.

Only the authenticated target (or a target which receives the data flow from the controller 202) may decrypt the encrypted authentication information 1135 based on an encryption/decryption key included in the authentication information of the data flow received from the controller 202.

The decrypted authentication information may be composed of information in the form of a one-time password (OTP) changed every authentication time point and random generation, rather than a fixed value every data packet authentication time point like data flow identification information. Thus, the above network structure may resolve a problem occurring because the authentication information is transmitted as fixed authentication information while maintaining flow of the data packet by the data flow received from the controller 202, when the authentication information is not changed every authentication time point and when encrypting and transmitting the authentication information.

The access control app 211 and a gateway or server 210 may generate OTP information changed every authentication time point based on information for generating and verifying an OTP included in the authentication information of the data flow, may encrypt the corresponding value, and may transmit a data packet including data flow header information into which data flow identification information is inserted.

Figure 12:
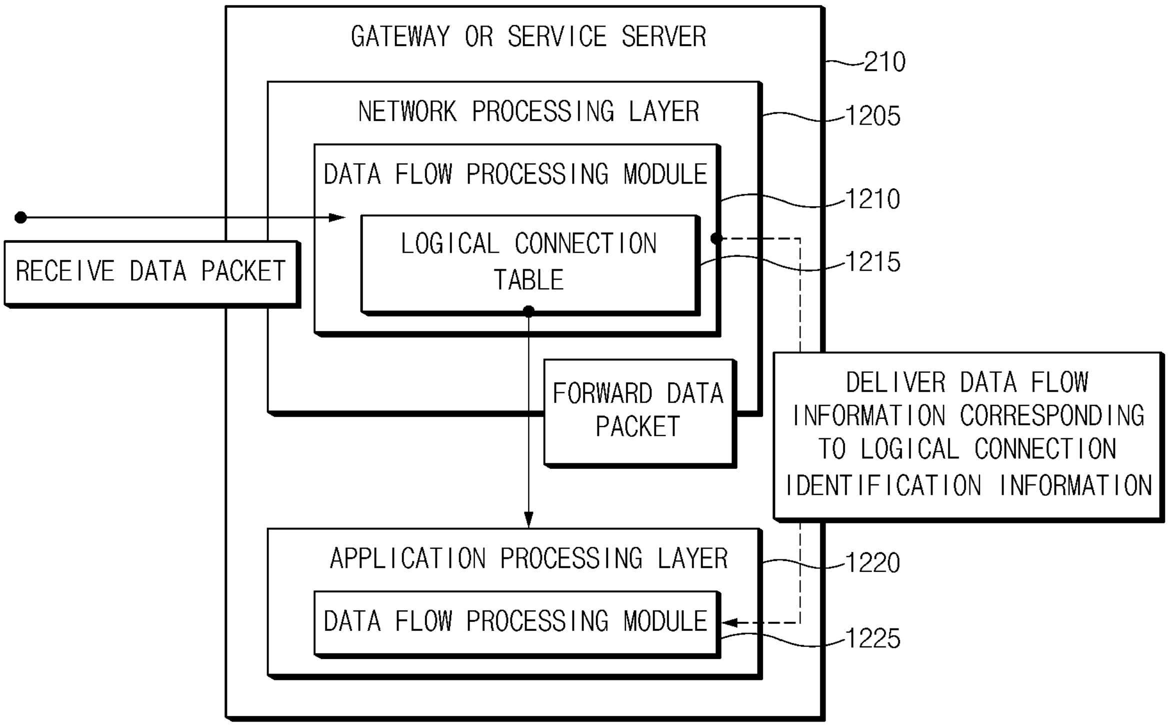
FIG. 12 is a drawing for describing a gateway or a service server according to various embodiments.

FIG. 12 is a drawing for describing a gateway or a service server according to various embodiments.

A gateway or service server 210 may include a network processing layer 1205 and an application processing layer 1220. For example, the network processing layer 1205 may include layer 3 or 4 among OSI 7 layers and the application processing layer 1220 may include layer 7.

A data flow processing module 1210 included in the network processing layer 1205 of the gateway or service server 210 may identify a data flow header from a received data packet and may decrypt data flow authentication information using data flow identification information included in the data flow header and a decryption key included in data flow corresponding to the data flow identification information, thus identifying that the data packet is transmitted from an authorized target by means of an OTP verification algorithm.

The data flow processing module 1210 may remove a data flow header which is present in an existing data packet and a data flow processing module 1225 which is present in the application processing layer 1220 (e.g., a proxy or a web server) may generate and forward information for identifying data flow. For example, the data flow processing module 1210 may generate data flow identification information according to a scheme for combining at least any one of pieces of information included in the data packet, for example, hash information in which a source IP, a source port, a protocol, a destination IP, and a destination protocol are combined with one another, to generate identification information, may deliver the data flow identification information to the application processing layer 1220, and may forward the data packet. According to an embodiment, the data flow processing module 1210 may deliver unique information capable of identifying data flow to the application processing layer 1220.

The data flow processing module 1225 which is present in the application processing layer 1220 may combine pieces of information included in the data packet received from the network processing layer 1205 to generate identification information and may compare the identification information with the data flow identification information received from the network processing layer 1205 to identify data flow, may classify the data flow in units of a series of service requests for being processed by an application (e.g., a proxy or a web server) (e.g., a bundle of data packets for processing one service request based on a standard specification such as the HTTP), thus accepting and denying or filtering the service request depending on service information included in the data flow.

Figure 13:
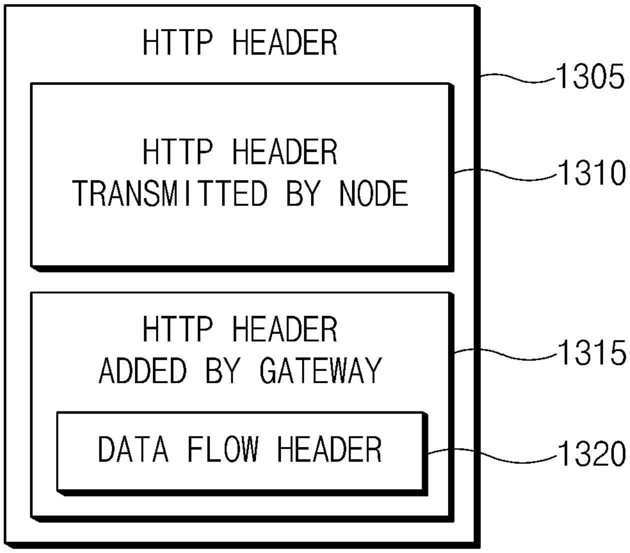
FIG. 13 illustrates an example of a header capable of being processed by an application processing layer according to various embodiments.

FIG. 13 illustrates an example of a header capable of being processed by an application processing layer according to various embodiments.

Referring to FIG. 13, the header capable of being processed by the application processing layer may include an HTTP header 1305. The HTTP header 1305 may be an example of a protocol header.

When receiving a service request of an authenticated target from a network processing layer, a proxy included in a gateway 203 may identify an access target and a service application requested by the access target based on a data flow table. Furthermore, the gateway 203 may service to insert and retransmit data flow header information capable of identifying a service request target in service servers 205 and 206 into a portion suitable for a protocol of the service application (e.g., a header area for the HTTP) to the service servers 205 and 206 based on authentication information included in data flow and return response values of the service servers 205 and 206 to the service request to a node 201.

The data flow header may be information inserted by the gateway 203 to identify whether there is a data packet authenticated by the service servers 205 and 206 based on data flow received from a controller 202 in data packet flow between a target app, the gateway 203, and the service servers 205 and 206.

According to an embodiment, the data flow header may be composed of data flow identification information and encrypted authentication information.

Because there is no information capable of being identified in a data packet on an IP network except for 5-tuple information (e.g., a protocol, a source IP and port, and a destination IP and port), it may not be seen whether a node 201 which is assigned an IP is substantially authenticated and whether the data packet is transmitted by a target granted by an application which is a substantial communication entity.

When processing the service request, the service servers 205 and 206 may provide an effective method capable of querying the controller 202 using the data flow identification information included in the data flow header to identify whether the authenticated target is accessed, receiving additional information about the authenticated target, which is stored by the controller 202, to perform authentication processing.

In addition, the encrypted authentication information except for the data flow identification information included in the data flow header may be used for the purpose of identifying whether the authenticated gateway 203 forwards a service.

The gateway 203 may provide a method for generating OTP information changed every service request forwarding time point based on information for generating and verifying an OTP included in authentication information of data flow, encrypting an OTP value, and forwarding service request information including the data flow header into which the data flow identification information is inserted to allow the service servers 205 and 206 to receive and verify the service request from the authenticated gateway.

Furthermore, when header information is included in the received service request result after forwarding the service request information, the gateway 203 may remove unnecessary information, such that the node 201 is unable to identify the information, and may forward a service request result.

Figure 14:
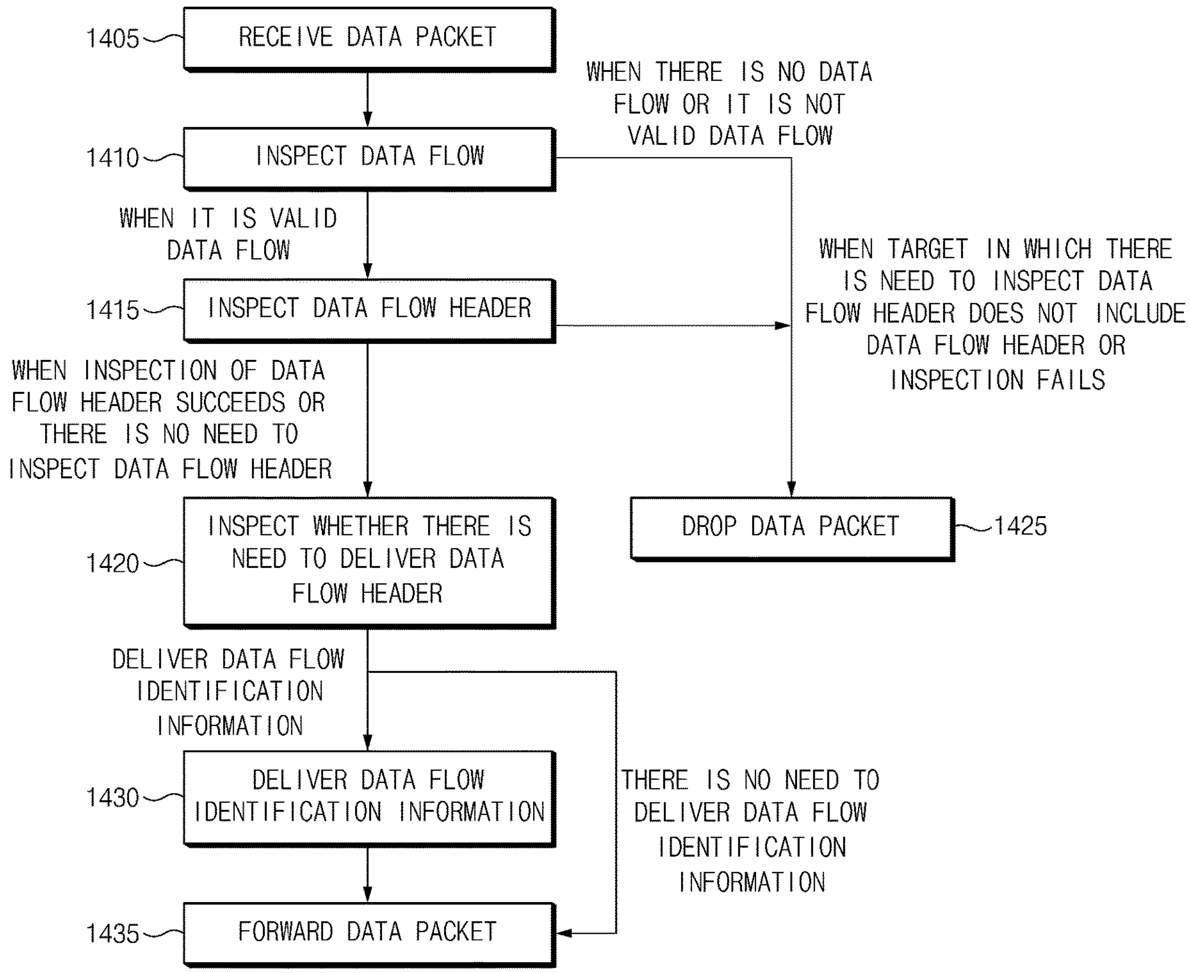
FIG. 14 illustrates an operational flowchart for receiving a data packet of a network processing layer of a gateway or a service server according to various embodiments.

FIG. 14 illustrates an operational flowchart for receiving a data packet of a network processing layer of a gateway or a service server according to various embodiments. Operations shown in FIG. 14 may be performed by means of a gateway 203 or service servers 205 and 206 of FIG. 2.

In operation 1405, a gateway or service server 210 may receive a data packet through a network processing layer. For example, the gateway or service server 210 may receive a data packet through a data flow processing module which is present in the network processing layer.

In operation 1410, the gateway or service server 210 may identify whether there is data flow corresponding to a destination IP and port information included in an IP header of the received data packet and protocol information (e.g., a TCP or a UDP), by means of the data processing layer. According to an embodiment, when the data flow is present, but is not valid (e.g., when it is impossible to forward a data packet) or when the data flow is not present, in operation 1425, the gateway or service server 210 may drop the data packet.

When the data flow is present and valid, the gateway or service server 210 may identify whether there is a need to inspect authentication information of the data packet based on authentication information of the data flow, by means of the network processing layer. According to an embodiment, when there is no need to inspect the authentication information, the gateway or service server 210 may remove a data flow header included in the data packet and may perform operation 1420.

When there is the need to inspect the authentication information, in operation 1415, the gateway or service server 210 may identify whether a data flow header is included in the data packet, by means of the network processing layer. According to an embodiment, when the data flow header is not included in the data packet, in operation 1425, the gateway or service server 210 may drop the data packet.

According to an embodiment, when there is the data flow header, the gateway or service server 210 may identify whether there is valid data flow corresponding to the data flow identification information included in the data flow header. According to an embodiment, when there is no valid data flow corresponding to the data flow identification information, in operation 1425, the gateway or service server 210 may drop the data packet.

When there is the valid data flow corresponding to the data flow identification information, the gateway or service server 210 may decrypt the authentication information included in the data flow header by means of an authentication information decryption algorithm and a decryption key included in the authentication information of the valid data flow, by means of the network processing layer. According to an embodiment, when the decryption fails, in operation 1425, the gateway or service server 210 may drop the data packet.

When the decryption succeeds, the gateway or service server 210 may identify whether the decrypted authentication information is valid, using an authentication information inspection algorithm or related information included in the authentication information of the valid data flow. According to an embodiment, when the decrypted authentication information is not valid, in operation 1425, the gateway or service server 210 may drop the data packet. According to an embodiment, when the decrypted authentication information is valid, the gateway or service server 210 may remove the data flow header included in the data packet and may perform operation 1420.

In operation 1420, the gateway or service server 210 may identify whether to deliver data flow identification information capable of being identified by the application processing layer when forwarding the data packet in the authentication information of the data flow identified in operation 1410 to the application processing layer. According to an embodiment, when there is no need to deliver the data flow identification information, the gateway or service server 210 may forward the data packet to the application processing layer.

According to an embodiment, the data flow identification information capable of being identified by the application processing layer may be stored in a memory which is accessible to both the network processing layer and the application processing layer.

When there is the need to deliver the data flow identification information, in operation 1430, the gateway or service server 210 may forward the data flow identification information capable of being identified by the application processing layer and the data packet together. For example, the gateway or service server 210 may generate data flow identification information based on a scheme for combining at least any one of pieces of hash information in which a source IP, a source port, a protocol, a destination IP, and a destination protocol are combined with one another to generate identification information and may update and deliver the generated data flow identification information to authentication information of data flow to the application processing layer.

In operation 1435, the gateway or service server 210 may forward the data packet to the application processing layer.

Figure 15:
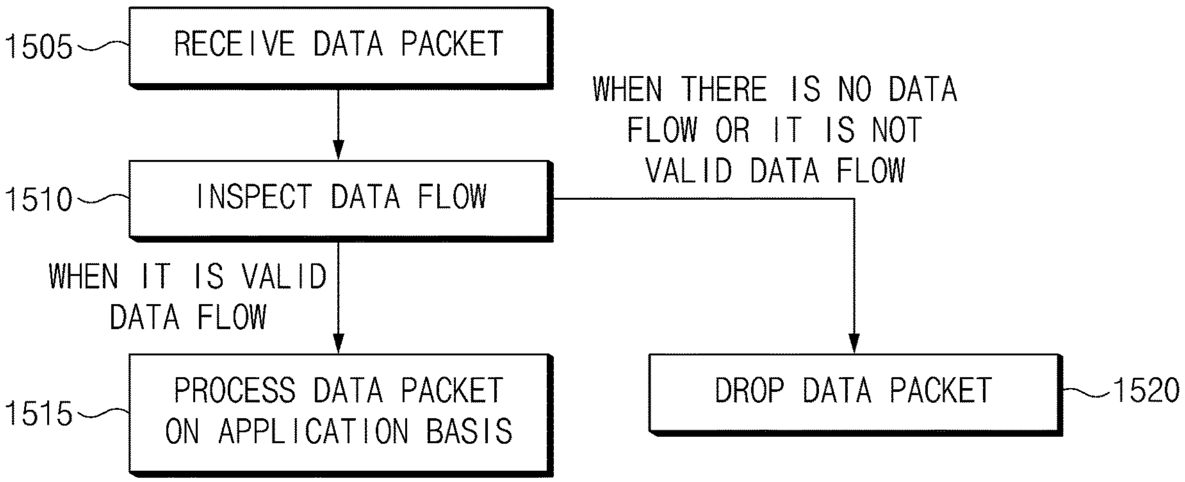
FIG. 15 illustrates an operational flowchart for receiving a data packet of an application processing layer of a gateway or a service server according to various embodiments.

FIG. 15 illustrates an operational flowchart for receiving a data packet of an application processing layer of a gateway or a service server according to various embodiments. Operations shown in FIG. 15 may be performed by means of a gateway 203 or service servers 205 and 206 of FIG. 2.

In operation 1505, a gateway or service server 210 may receive a data packet through an application processing layer. For example, the gateway or service server 210 may receive a data packet transmitted by a network processing layer through a data flow processing module which is present in the application processing layer. According to an embodiment, the gateway or server 210 may receive a data packet and data flow identification information forwarded from a network processing layer through an application processing layer.

In operation 1510, the gateway or service server 210 may generate information capable of identifying data flow from the received data packet, by means of the application processing layer. For example, the gateway or service server 210 may generate data flow identification information based on a scheme for combining at least any one of pieces of hash information in which a source IP, a source port, a protocol, a destination IP, and a destination protocol of the data packet are combined with one another to generate identification information, by means of the application processing layer. According to an embodiment, the gateway or service server 210 may compare the data flow identification information received from the network processing layer with the generated data flow identification information and may identify whether there is valid data flow corresponding to the identification information, by means of the application processing layer.

According to an embodiment, when there is no valid data flow, in operation 1520, the gateway or service server 210 may drop the data packet.

According to an embodiment, when there is the data flow, in operation 1515, the gateway or service server 210 may classify the data packet to be substantially processed by the application.

Through the operations shown in FIG. 15, an IP-based data packet fragmented according to a maximum transmission unit (MTU) may be merged in substantial service processing units on the basis of the previously identified data flow identification information and may be processed such that the application is able to perform service processing.

Figure 16:
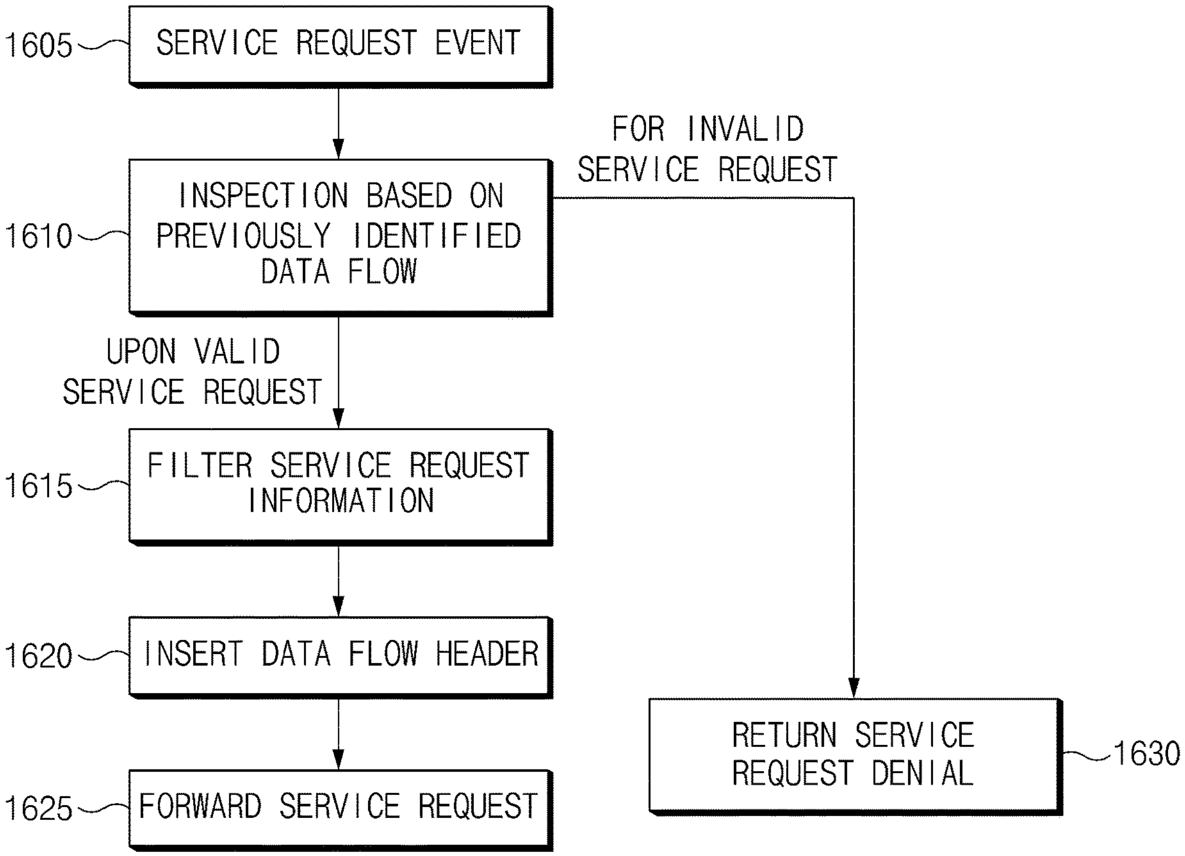
FIG. 16 illustrates an operational flowchart for processing a service request of an application processing layer of a gateway or a service server according to various embodiments.

FIG. 16 illustrates an operational flowchart for processing a service request of an application processing layer of a gateway or a service server according to various embodiments. Operations shown in FIG. 16 may be performed by means of a gateway 203 or service servers 205 and 206 of FIG. 2.

Referring to FIG. 16, in operation 1605, a gateway or service server 210 may receive a service request through an application (e.g., a proxy or a web server) which is present in an application processing layer.

In operation 1610, the gateway or service server 210 may identify whether a service request is valid based on service request information classified based on data flow corresponding to data flow identification information included in a data packet transmitted from the network processing layer and identified data flow information, by means of the application processing layer. For example, the gateway or service server 210 may identify whether a destination IP or domain identification information and port information included in the received service request header and URL information are present in service information of data flow, by means of the application processing layer.

According to an embodiment, for an invalid service request, in operation 1630, the gateway or service server 210 may return service request denial.

For a valid service request, in operation 1615, the gateway or service server 210 may identify whether a protocol of the service request (e.g., the HTTP, the FTP, a dedicated protocol for an IoT device, or the like) is normal based on service filtering information included in the service information of the data flow. According to an embodiment, when the protocol of the service request is not normal, in operation 1630, the gateway or service server 210 may deny the service request.

According to an embodiment, when filtering information included upon the service request and when there is a need to replace the information, in operation 1625, the gateway or service server 210 may replace service request information based on replacement information or rule included in the service filtering information and may transmit the service request.

According to an embodiment, when there is no need to replace the service request, in operation 1625, the gateway or service server 210 may transmit the service request.

According to an embodiment, when there is need to block the service request, in operation 1630, the gateway or service server 210 may deny the service request.

According to an embodiment, when there is no need to filter the service request, in operation 1625, the gateway or service server 210 may transmit the service request.

According to an embodiment, before transmitting the service request, in operation 1620, the gateway or service server 210 may insert a data flow header into the service request. However, when operation 1620 is not performed and the service request is transmitted or when the gateway or service server 210 is able to internally process the service request, both operations 1620 and 1625 may fail to be performed.

According to an embodiment, the gateway or service server 210 may generate authentication information using an authentication information generation algorithm and additional information included in authentication information of data flow. Furthermore, the gateway or service server 210 may then encrypt the authentication information using an encryption algorithm or an encryption key included in the authentication information. In this case, the gateway or service server 210 may insert data flow header information into service request information depending on a protocol specification of a service application and may forward a service request into which a data flow header in which the encrypted authentication information and the data flow identification information are combined with each other is inserted.

Figure 17:
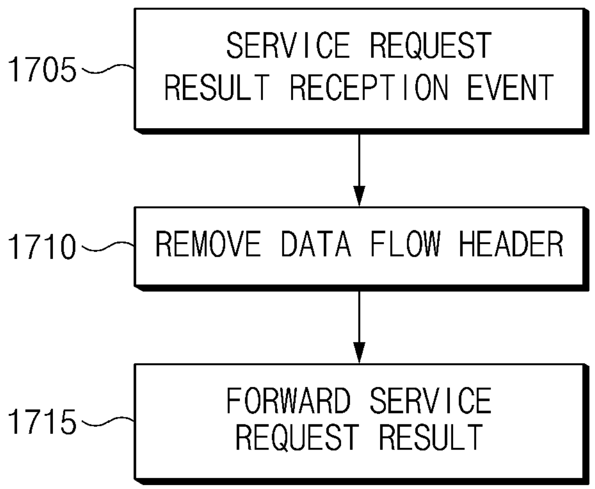
FIG. 17 illustrates an operational flowchart for processing a service request result of an application processing layer of a gateway or a service server according to various embodiments.

FIG. 17 illustrates an operational flowchart for processing a service request result of an application processing layer of a gateway or a service server according to various embodiments. Operations shown in FIG. 17 may be performed by means of a gateway 203 or service servers 205 and 206 of FIG. 2.

In operation 1705, a gateway or service server 210 may receive a service request through an application (e.g., a proxy or a web server) which is present in an application processing layer.

When there is a data flow header inserted upon the service request in service request result information, in operation 1710, the gateway or service server 210 may remove a data flow header.

In operation 1715, the gateway or service server 210 may forward the service request result in which the data flow header is removed or a service request in which there is no data flow header to a node 201.

Figure 18:
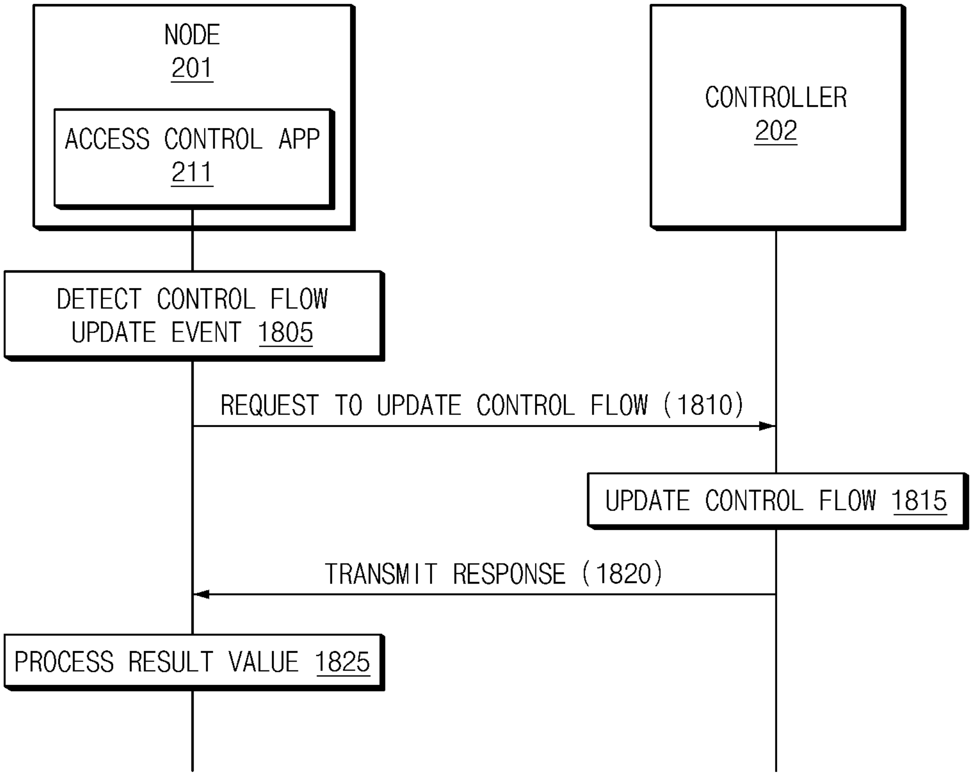
FIG. 18 illustrates a signal sequence diagram for updating control flow according to various embodiments.

FIG. 18 illustrates a signal sequence diagram for updating control flow according to various embodiments.

Referring to FIG. 18, in operation 1805, an access control app 211 may detect a control flow update event.

In operation 1810, the access control app 211 may request a controller 202 to update control flow based on control flow identification information.

In operation 1815, the controller 202 may identify whether there is control flow in a control flow table (e.g., a control flow table 315 of FIG. 3) based on the received control flow identification information. According to an embodiment, when there is no control flow (e.g., when access is released by another security system or when access is released by internal risk detection or the like), because access of the node 201 is not valid, in operation 1820, the controller 202 may transmit an inaccessible result to the access control app 211.

When there is the control flow in the control flow table (e.g., the control flow table 315 of FIG. 3), the controller 202 may update an update time. In this case, in operation 1820, the controller 202 may transmit the identification information of the updated control flow to the access control app 211.

In an embodiment, when re-authentication should be performed in data flow dependent on the identified control flow or when there is data flow which is no longer inaccessible, in operation 1820, the controller 202 may transmit information about the data flow to the access control app 211.

In operation 1825, the access control app 211 of the node 201 may process a result value for the response received from the controller 202. For example, when the result of updating the control flow is impossible, the access control app 211 may block all network access of the application. For another example, when the result of updating the data flow is normal and there is the updated data flow information, the access control app 211 may update the data flow.

Figure 19:
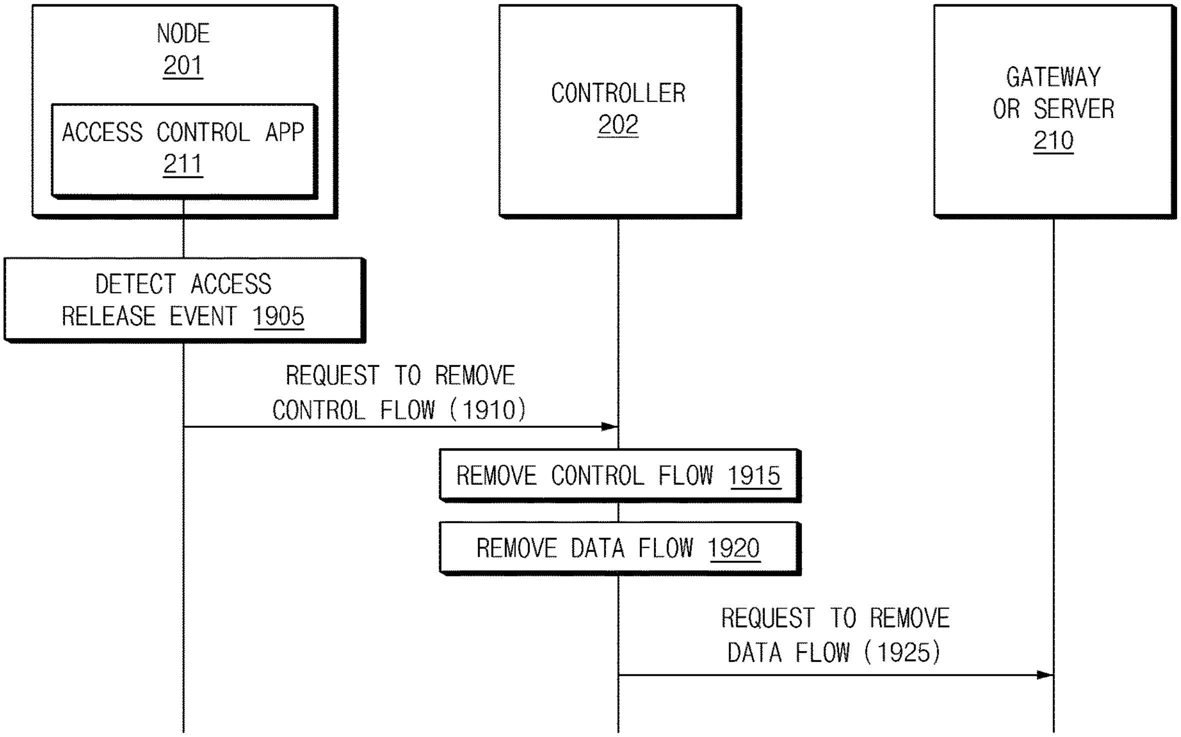
FIG. 19 illustrates a signal sequence diagram for releasing access according to various embodiments.

FIG. 19 illustrates a signal sequence diagram for releasing access according to various embodiments.

Referring to FIG. 19, in operation 1905, a node 201 may detect at least any one of access end requests based on the end of the node 201, the end of an access control app 211, the end of a target app, that network access is no longer used, and information identified from an interworking system. In this case, in operation 1910, the node 201 or the access control app 211 may request the controller 202 to remove control flow.

In operation 1915, the controller 202 may remove control flow identified based on received control flow identification information.

In operation 1920, the controller 202 may remove all data flow dependent on the removed control flow. Thus, the node 201 may no longer access a destination network based on the removed data flow.

In operation 1925, the controller 202 may request a gateway or server 210 to remove all the data flow dependent on the removed control flow. In this case, the gateway or server 210 may remove data flow and may remove a session such that a corresponding application is no longer able to transmit a data packet.

Figure 20:
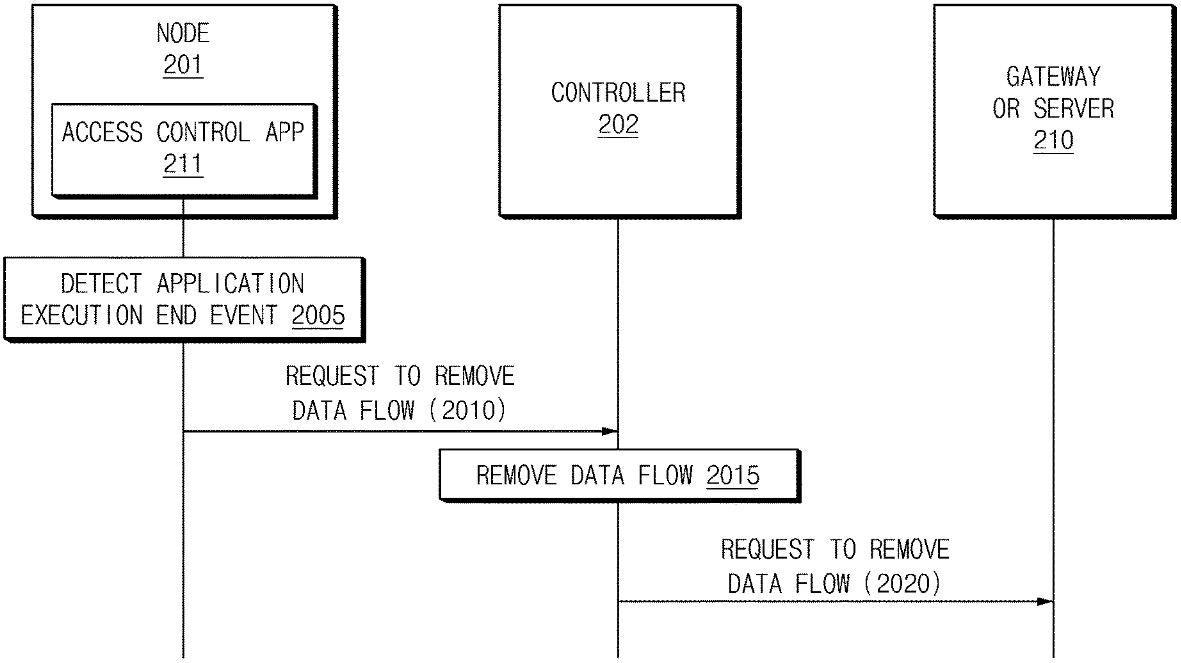
FIG. 20 illustrates a signal sequence diagram for ending application execution according to various embodiments.

FIG. 20 illustrates a signal sequence diagram for ending application execution according to various embodiments.

Referring to FIG. 20, in operation 2005, an access control app 211 of a node 201 may identify whether an application which is running is ended in real time and may detect an application execution end event.

According to an embodiment, the access control app 211 may identify whether there is data flow corresponding to identification information of the ended application and process ID AND child process ID tree (PID) information.

In operation 2010, the access control app 211 may request the controller 202 to remove data flow. For example, the access control app 211 may transmit the identification information of the ended application or identification information of data flow corresponding to the ended application to the controller 202 and may request the controller 202 to remove the data flow.

In operation 2015, the controller 202 may delete the data flow, the removal of which is requested. Furthermore, the controller 202 may request a gateway or server 210 to remove the removed data flow. Thus, the data packet corresponding to a source network, a destination network, and port information included in the removed data flow may no longer be transmitted. Furthermore, the gateway or server 210 may remove a session corresponding to the data flow, thus providing a state in which the application is no longer able to transmit the data packet to a destination.

Figure 21:
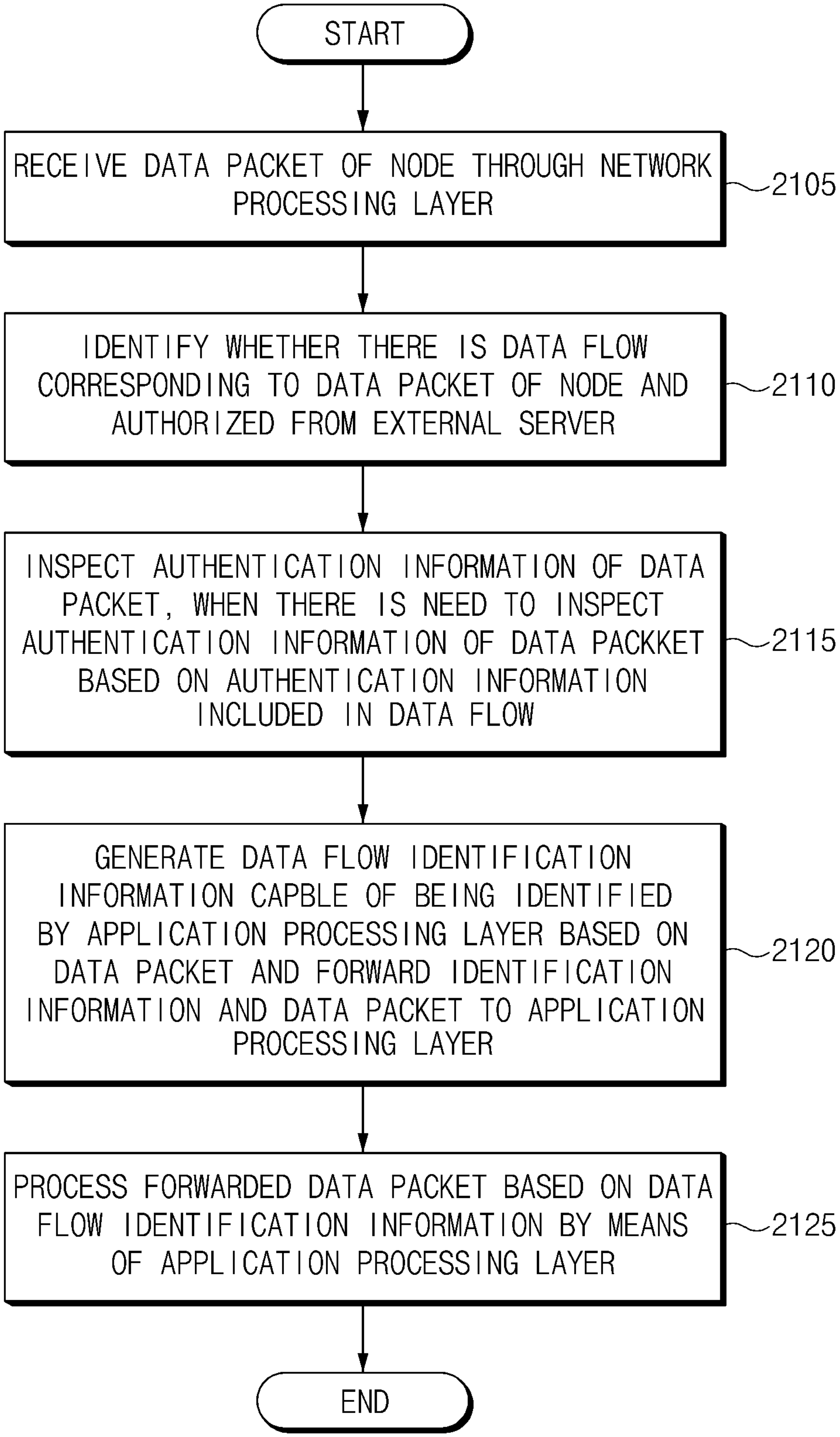
FIG. 21 illustrates a flowchart for an operation method of a gateway according to various embodiments.

FIG. 21 illustrates a flowchart for an operation method of a gateway according to various embodiments. Operations shown in FIG. 21 may be performed by means of a gate 203 of FIG. 2.

Referring to FIG. 21, in operation 2105, the gateway 203 may receive a data packet of a node through a network processing layer.

In operation 2110, the gateway 203 may identify whether there is data flow which corresponds to the data packet of the node and is authorized from an external server.

In operation 2115, the gateway 203 may inspect authentication information of the data packet, when there is a need to inspect the authentication information of the data packet based on authentication information included in the data flow.

In operation 2120, the gateway 203 may generate data flow identification information capable of being identified by an application processing layer based on the data packet and may forward the data packet to the application processing layer.

In operation 2125, the gateway 203 may process the forwarded data packet based on the data flow identification information, by means of the application processing layer.

The operations shown in FIG. 21 may be performed by means of service servers 205 and 206 of FIG. 2.

According to embodiments disclosed in the present disclosure, an implicit trust relationship between layers (layer 3 and layer 4) processed by the operating system and a layer (layer 7) processed by the application may be removed. The layer processed by the application may identify a substantial communication target in IP communication.

Furthermore, according to embodiments disclosed in the present disclosure, a technology may be provided to identify a source node using the same data flow identification information between layer 3, layer 4, and layer 7, based on a logical connection and corresponding identification information for maintaining communication and a connection or session using a transmission control protocol (TCP) or a user diagram protocol (UDP) processed in layer 4 (a transport layer), when IP communication is performed between the source node and the destination node and perform connection and access related processing of the destination node depending on the identified result.

Furthermore, according to embodiments disclosed in the present disclosure, a logical connection and logical connection identification information generated based on data flow identification information inserted upon a logical connection request may be stored in data flow by means of a data flow module for controlling a data packet in an operating system (kernel) level of the gateway and information may be inserted and delivered such that layer 7 is able to identify data flow information. The proxy which is present in layer 7 may process data flow based on the data flow identification information inserted by the data flow module, rather than identifying data flow using the source IP and the destination IP.

Furthermore, according to embodiments disclosed in the present disclosure, a complete identification information integration system of layer 3, layer 4, and layer 7 based on logical connection identification of the authenticated and authorized source node may be provided without an additional procedure such as a tunneling connection.

Furthermore, according to embodiments disclosed in the present disclosure, when the data flow module located in layer 4 and the application located in layer 7 are connected with each other in a scheme such as an application procedure interface (API), a system may be provided to deliver data flow identification information corresponding to identification information of a logical connection to the application, search for data flow information corresponding to logical connection identification information identified by the application, and process data flow based on the information.

Furthermore, according to embodiments disclosed in the present disclosure, the server may previously obtain the authenticated and identified terminal, the user, the application, and various pieces of related information, thus addressing various problems inherent in IP communication.

In addition, various effects ascertained directly or indirectly through the present disclosure may be provided.

The above description is merely an illustrative explanation of the technical idea disclosed in the present disclosure, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the technical idea disclosed in the present disclosure should be interpreted in accordance with the claims below, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gateway, comprising:
- a communication circuit;
- a memory; and
- a processor operatively connected with the communication circuit and the memory,
- wherein the processor is configured to:
  - receive a data packet from a node through a network processing layer;
  - identify whether there is a data flow corresponding to the data packet from the node and authorized from an external server;
  - wherein the processor is further configured to, by the network processing layer:
    - identify whether a data flow header is included in the data packet and drop the data packet when the data flow header is not included;
    - identify whether there is a valid data flow corresponding to the data flow header, when the data flow header is included, and drop the data packet when there is no valid data flow;
    - identify whether to decrypt authentication information included in the data flow header and whether the authentication information included in the data flow header is valid, based on the authentication information included in the valid data flow;
    - drop the data packet when the authentication information included in the data flow header is not valid; and
    - remove the data flow header and insert a new data flow header which includes data flow identification information capable of being identified by an application processing layer into the data packet, when the authentication information included in the data flow header is valid; and
  - forward the data packet to the application processing layer; and
  - process the forwarded data packet based on the data flow identification information by the application processing layer,
- wherein the new data flow header includes the data flow identification information and the authentication information being combined with each other.

2. The gateway of claim 1, wherein the processor is configured to:
- generate the data flow identification information depending on a scheme for combining pieces of information included in the data packet by the network processing layer; or
- extract a portion of the authentication information included in the data packet to generate the data flow identification information, by the network processing layer, and
- wherein the data flow identification information is stored in the memory accessible to the network processing layer and the application processing layer.

3. The gateway of claim 2, wherein the pieces of information included in the data packet include hash information in which a source IP, a source port, a destination IP, a protocol, and a destination protocol are combined with one another.

4. The gateway of claim 1, wherein the processor is configured to:
- generate the data flow identification information capable of being identified by the application processing layer based on data received from the network processing layer, by the application processing layer;
- identify whether there is valid data flow corresponding to the data flow identification information capable of being identified by the application processing layer; and
- perform service processing based on the data packet, when there is the valid data flow.

5. The gateway of claim 4, wherein the processor is configured to:
- identify whether there is service information corresponding to service request information classified based on the valid data flow;
- process a service request corresponding to the service request information, when there is service information; and
- deny the service request, when there is no service information.

6. The gateway of claim 5, wherein the processor is configured to:
- inspect the service request based on service filtering information included in the service information, by the application processing layer;
- generate the authentication information based on the data flow, when there is no need to replace or block the service request based on the service filtering information; and
- insert the generated authentication information and the data flow identification information into the service request information.

7. The gateway of claim 6, wherein the processor is configured to:
- inspect whether a protocol of the service request is normal based on the service filtering information, by the application processing layer;
- deny the service request, when the protocol of the service request is not normal; and
- replace the service request based on the service filtering information to process the service request or block the service request to deny the service request, when there is a need to filter the service request.

8. The gateway of claim 6, wherein the processor is configured to:

identify whether the data flow identification information or the authentication information inserted upon the service request is included in a service request result corresponding to the service request, when receiving the service request result to delete the inserted data flow identification information or the inserted authentication information and forward the service request result, by the application processing layer.

9. A gateway, comprising:

a communication circuit;

a memory; and a processor operatively connected with the communication circuit and the memory, wherein the processor is configured to:

receive a data packet from a node through a network processing layer;

identify whether there is a data flow corresponding to the data packet from the node and authorized from an external server; wherein the processor is configured to, by the network processing layer:

identify whether a data flow header is included in the data packet and drop the data packet when the data flow header is not included;

identify whether there is a valid data flow corresponding to the data flow header, when the data flow header is included, and drop the data packet when there is no valid data flow;

identify whether to decrypt authentication information included in the data flow header and whether the authentication information included in the data flow header is valid, based on the authentication information included in the valid data flow;

drop the data packet when the authentication information included in the data flow header is not valid; and remove the data flow header and insert a new data flow header which includes data flow identification information capable of being identified by an application processing layer into the data packet, when the authentication information included in the data flow header is valid;

update the authentication information of the data flow;

forward the data packet to the application processing layer; and process a service associated with the forwarded data packet based on the updated authentication information of data flow, by the application processing layer, wherein the new data flow header includes the data flow identification information and the updated authentication information being combined with each other.

10. A service server, comprising:

a communication circuit;

a memory; and a processor operatively connected with the communication circuit and the memory, wherein the processor is configured to:

receive a data packet from a node through a network processing layer;

identify whether there is data flow corresponding to the data packet from the node and authorized from an external server;

wherein the processor is configured to, by the network processing layer:

identify whether a data flow header is included in the data packet and drop the data packet when the data flow header is not included;

identify whether there is a valid data flow corresponding to the data flow header, when the data flow header is included, and drop the data packet when there is no valid data flow;

identify whether to decrypt authentication information included in the data flow header and whether the authentication information included in the data flow header is valid, based on the authentication information included in the valid data flow;

drop the data packet when the authentication information included in the data flow header is not valid; and remove the data flow header and insert a new data flow header which includes data flow identification information capable of being identified by an application processing layer into the data packet, when the authentication information included in the data flow header is valid and;

forward the data packet to the application processing layer, wherein the new data flow header includes the data flow identification information and the authentication information being combined with each other.

11. The service server of claim 10, wherein the processor is configured to:

generate the data flow identification information depending on a scheme for combining pieces of information included in the data packet, by the network processing layer; or extract a portion of the authentication information included in the data packet to generate the data flow identification information, by the network processing layer.

12. The service server of claim 11, wherein the pieces of information included in the data packet include hash information in which a source IP, a source port, a destination IP, a protocol, and a destination protocol are combined with one another.

13. The service server of claim 10, wherein the processor is configured to:

generate the data flow identification information capable of being identified by the application processing layer based on data received from the network processing layer, by the application processing layer;

identify whether there is valid data flow corresponding to the data flow identification information capable of being identified by the application processing layer; and perform service processing based on the data packet, when there is the valid data flow.

14. The service server of claim 13, wherein the processor is configured to:

identify whether there is service information corresponding to service request information classified based on the valid data flow, by the application processing layer;

process a service request corresponding to the service request information, when there is service information; and deny the service request, when there is no the service information.

15. An operation method of a gateway, the operation method comprising:

receiving a data packet from a node through a network processing layer;

identifying whether there is a data flow corresponding to the data packet from the node and authorized from an external server;

wherein the processor is configured to, by the network processing layer:

identifying whether a data flow header is included in the data packet and dropping the data packet when the data flow header is not included;

identifying whether there is a valid data flow corresponding to the data flow header, when the data flow header is included, and dropping the data packet when there is no valid data flow;

identifying whether to decrypt authentication information included in the data flow header and whether the authentication information included in the data flow header is valid, based on the authentication information included in the valid data flow;

dropping the data packet when the authentication information included in the data flow header is not valid; and removing the data flow header and inserting a new data flow header which includes data flow identification information capable of being identified by an application processing layer into the data packet, when the authentication information included in the data flow header is valid;

forwarding the data packet to the application processing layer; and processing the forwarded data packet based on the data flow identification information by the application processing layer, wherein the new data flow header includes the data flow identification information and the authentication information being combined with each other.

16. The operation method of a gateway of claim 15, wherein the processor is configured to:

generate the data flow identification information depending on a scheme for combining pieces of information included in the data packet, by the network processing layer; or extract a portion of the authentication information included in the data packet to generate the data flow identification information, by the network processing layer, and wherein the data flow identification information is stored in the memory accessible to the network processing layer and the application processing layer.

17. The operation method of a gateway of claim 16, wherein the pieces of information included in the data packet include hash information in which a source IP, a source port, a destination IP, a protocol, and a destination protocol are combined with one another.

18. The operation method of a gateway of claim 15, wherein the processor is configured to:

generate the data flow identification information capable of being identified by the application processing layer based on data received from the network processing layer, by the application processing layer;

identify whether there is valid data flow corresponding to the data flow identification information capable of being identified by the application processing layer; and perform service processing based on the data packet, when there is the valid data flow.

19. The operation method of a gateway of claim 18, wherein the processor is configured to:

identify whether there is service information corresponding to service request information classified based on the valid data flow;

process a service request corresponding to the service request information, when there is service information; and deny the service request, when there is no service information.

20. The operation method of a gateway of claim 19, wherein the processor is configured to:

inspect the service request based on service filtering information included in the service information, by the application processing layer;

generate the authentication information based on the data flow, when there is no need to replace or block the service request based on the service filtering information; and insert the generated authentication information and the data flow identification information into the service request information.

* * * * *